(12) United States Patent
Cheng et al.

(10) Patent No.: US 10,087,501 B2
(45) Date of Patent: Oct. 2, 2018

(54) PROCESSES FOR THE SELECTIVE SEPARATION OF IRON AND ALUMINIUM

(71) Applicants: UNIVERSITY OF SOUTH AUSTRALIA, Adelaide (AU); SHANXI RUIENZE TECHNOLOGY CO. LTD, Taiyuan (CN); Shanxi University, Taiyuan (CN)

(72) Inventors: Fangqin Cheng, Taiyuan (CN); Li Cui, Taiyuan (CN); Jingfang Zhou, Mawson Lakes (AU); John Ralston, Mitcham (AU); Fangbin Xue, Taiyuan (CN)

(73) Assignees: University of South Australia, Adelaide (AU); Shanxi Ruienze Technology Co., Ltd., Taiyuan (CN); Shanxi University, Taiyuan (CN)

( * ) Notice: Subject to any disclaimer, the term of this patent is extended or adjusted under 35 U.S.C. 154(b) by 0 days.

(21) Appl. No.: 15/500,751

(22) PCT Filed: Aug. 7, 2015

(86) PCT No.: PCT/AU2015/000469
§ 371 (c)(1),
(2) Date: Jan. 31, 2017

(87) PCT Pub. No.: WO2016/019419
PCT Pub. Date: Feb. 11, 2016

(65) Prior Publication Data
US 2017/0218477 A1    Aug. 3, 2017

(30) Foreign Application Priority Data
Aug. 7, 2014 (AU) .............................. 2014903073

(51) Int. Cl.
C22B 3/00 (2006.01)
C22B 3/26 (2006.01)
C01F 7/62 (2006.01)
C21B 15/00 (2006.01)

(52) U.S. Cl.
CPC ............... *C22B 3/004* (2013.01); *C01F 7/62* (2013.01); *C21B 15/00* (2013.01); *C22B 3/0005* (2013.01); *Y02P 10/234* (2015.11)

(58) Field of Classification Search
CPC ...................... C22B 3/20; C22B 3/205; C22B 3/0005–3/0098; B01D 11/00; B01D 11/04–11/0496; B01D 2011/002; B01D 2011/005
USPC .............................. 423/139, 112, 132, 150.3
See application file for complete search history.

(56) References Cited

U.S. PATENT DOCUMENTS

| 4,042,664 A * | 8/1977 | Cardwell | ............... | C01G 3/003 423/139 |
| 2012/0090439 A1 | 4/2012 | Rogers et al. | | |
| 2014/0299543 A1 | 10/2014 | Zhou et al. | | |

FOREIGN PATENT DOCUMENTS

| WO | 2012/079129 | 6/2012 |
| WO | 2012/079130 | 6/2012 |
| WO | 2014/058312 | 4/2014 |

OTHER PUBLICATIONS

International Search Report for PCT Application No. PCT/AU2015/000469 dated Aug. 31, 2015.

* cited by examiner

*Primary Examiner* — Steven J Bos
(74) *Attorney, Agent, or Firm* — Meyertons, Hood, Kivlin, Kowert & Goetzel P.C.; Mark R. DeLuca

(57) ABSTRACT

This disclosure relates to a process for selectively extracting Fe(III) ions from an aqueous feedstock containing Fe(III) ions and non-ferric ions. The process comprises contacting the feedstock with an organic phase comprising a phosphonium salt or ammonium salt ionic liquid under liquid-liquid extraction conditions for a time sufficient to allow transfer of at least some of the Fe(III) ions from the feedstock to the organic phase to provide an Fe(III) ion laden organic phase and an Fe(III) depleted feedstock, and separating the Fe(III) ion laden organic phase from the Fe(III) depleted feedstock.

20 Claims, 13 Drawing Sheets

PROCESSES FOR THE SELECTIVE SEPARATION OF IRON AND ALUMINIUM

PRIORITY DOCUMENT

The present application claims priority from Australian Provisional Patent Application No. 2014903073 titled "IRON SEPARATION PROCESSES" and filed on 7 Aug. 2014, the content of which is hereby incorporated by reference in its entirety.

TECHNICAL FIELD

The present disclosure relates to processes for separating iron from feed stocks containing iron and other metals, such as aluminium. In a particular form, the present disclosure relates to processes for separating iron from crude leachates, such as coal gangue leachate.

BACKGROUND

Coal gangue is a major by-product of coal processing and beneficiation. It contains approximately 18% to 40% alumina and 40 to 65% silica. High alumina-content ($\geq 30\%$) coal gangue has become a promising substitute for bauxite, a major aluminium source, due to the decrease of bauxite reserves and degradation of ore bodies. Many attempts have been made to extract aluminium and silicon products, as well as valuable metals such as gallium and titanium from coal gangue (Qian and Li 2015; Geng, et al., 2012; Zhao 2014). For example, aluminium products have been produced from coal gangue by acid leaching. However, iron(III) is the third most abundant element in coal gangue, occupying 2 to 10% in total and the iron in the raw material is brought into leaching solutions during the leaching process and this contaminates and stains resulting products. Therefore, the removal of iron from coal gangue leaching solutions is essential in order to obtain commercially acceptable aluminium, or other valuable metal products with high purity from these solutions.

At present, iron is usually removed from leach solutions by precipitation (Chang et al. 2010, Swarnkar et al. 1996). However, this method has some drawbacks, such as low selectivity due to co-precipitation and generation of fine precipitates which are difficult to remove from the leachate. Furthermore, the precipitates, commonly containing heavy metal ions, are of environmental concern. In addition, their disposal in controlled ponds is becoming more and more expensive due to strict environmental regulations.

Solvent extraction can separate, purify and concentrate metal ions, leading to subsequent production of pure products. It is a process that allows the separation of two or more components due to their unequal solubilities in two immiscible liquid phases. It is an important method for metal ion separation and also a commonly used industrial technique of major significance such as continuous operation mode, simple equipment, as well as high throughput (Tian, Li et al. 2010). In solvent extraction, dissolved metals are selectively separated from other components from an aqueous solution by an extraction agent. Traditionally, solvent extraction involves water-immiscible organic solvents, many of which are flammable, volatile or toxic. This gives rise to environmental and workplace hazards.

There is thus a need to provide processes that can be used to selectively remove iron from feed stocks containing other non-ferric metals, such as aluminium.

SUMMARY

The present disclosure arises from research into the use of economical ionic liquids, such as Cyphos IL 101 and Aliquat 336, as both extractants and solvents to separate iron from aluminium in coal gangue leachate.

According to a first aspect, there is provided a process for selectively extracting Fe(III) ions from an aqueous feedstock containing Fe(III) ions and non-ferric ions, the method comprising contacting the feedstock with an organic phase comprising a phosphonium salt or ammonium salt ionic liquid under liquid-liquid extraction conditions for a time sufficient to allow transfer of at least some of the Fe(III) ions from the feedstock to the organic phase to provide a Fe(III) ion laden organic phase and an Fe(III) depleted feedstock, and separating the Fe(III) ion laden organic phase from the Fe(M) depleted feedstock.

According to a second aspect, there is provided a use of a phosphonium salt or ammonium salt ionic liquid for selectively extracting Fe(III) ions from an aqueous feedstock containing Fe(III) ions and non-ferric ions comprising contacting the feedstock with an organic phase comprising the phosphonium salt or ammonium salt ionic liquid under liquid-liquid extraction conditions for a time sufficient to allow transfer of at least some of the Fe(III) ions from the feedstock to the organic phase to provide a Fe(III) ion laden organic phase and an Fe(III) depleted feedstock, and separating the Fe(M) ion laden organic phase from the Fe(III) depleted feedstock.

According to a third aspect, there is provided a process for selectively removing Fe(III) ions from a coal gangue leachate, the method comprising contacting the leachate with an organic phase comprising a phosphonium salt or ammonium salt ionic liquid under liquid-liquid extraction conditions for a time sufficient to allow transfer of at least some of the Fe(III) ions from the leachate to the organic phase to provide a Fe(III) ion laden organic phase and an Fe(III) depleted leachate, and separating the Fe(III) ion laden organic phase from the Fe(III) depleted leachate.

According to a fourth aspect, there is provided a process for recovering high purity aluminium products, such as aluminium chloride, from coal gangue, the process comprising leaching the coal gangue to provide a leachate, contacting the leachate with an organic phase comprising a phosphonium salt or ammonium salt ionic liquid under liquid-liquid extraction conditions for a time sufficient to allow selective transfer of at least some of the Fe(III) ions from the leachate to the organic phase to provide a Fe(III) ion laden organic phase and an Fe(III) depleted leachate, separating the Fe(III) ion laden organic phase from the Fe(III) depleted leachate, and recovering aluminium products from the Fe(III) depleted leachate.

In embodiments of the first to fourth aspects, the organic phase is substantially free of an extraneous organic extractant.

In embodiments of the first to fourth aspects, the organic phase is substantially free of a solvent other than the phosphonium salt or ammonium salt ionic liquid.

In embodiments of the first to fourth aspects, the organic phase consists essentially of the phosphonium salt or ammonium salt ionic liquid.

In embodiments of the first to fourth aspects, the process further comprises treating the aqueous feedstock or leachate to increase the concentration of inorganic anions therein prior to contact with the organic phase. The inorganic anion in these embodiments may be a halide ion selected from iodide, bromide, chloride, and fluoride. In specific embodiments, the inorganic anion is chloride. The step of treating the aqueous feedstock to increase the concentration of inorganic anions may comprise adding a source of inorganic anions to the aqueous feedstock.

In embodiments of the first and second aspects, the non-ferric ions in the feedstock are selected from one or more of the group of ions consisting of aluminium, magnesium, calcium and potassium ions.

In embodiments of the first and second aspects, the aqueous feedstock is a leachate. In embodiments, the leachate contains non-ferric ions selected from the group consisting of aluminium, sodium, calcium, and magnesium. In embodiments, the leachate is a coal gangue leachate.

In embodiments, the phosphonium salt or ammonium salt ionic liquid is a room temperature ionic liquid (RTIL).

In embodiments, the phosphonium salt or ammonium salt ionic liquid is a tetraalkylphosphonium salt ionic liquid. In embodiments, the tetraalkylphosphonium salt ionic liquid comprises at least three $C_4$ to $C_{20}$ alkyl groups. In embodiments, the tetraalkylphosphonium salt ionic liquid comprises a hydrophilic counter ion. In embodiments, the hydrophilic counter ion is selected from the group consisting of $Cl^-$, $Br^-$, $(NC)_2N^-$, $SO_4^{2-}$. In embodiments, the tetraalkylphosphonium salt ionic liquid is selected from the group consisting of trihexyltetradecylphosphonium chloride, trihexyltetradecylphosphonium bromide, trihexyltetradecylphosphonium dicyanamide, tributyl(methyl)phosphonium bromide, tributyl(methyl)phosphonium chloride, tributyl(hexyl)phosphonium bromide, tributyl(hexyl)phosphonium chloride, tributyl(octyl)phosphonium bromide, tributyl(octyl)phosphonium chloride, tributyl(decyl)phosphonium bromide, tributyl(decyl)phosphonium chloride, tetrabutylphosphonium bromide, and tetrabutylphosphonium chloride. In specific embodiments, the tetraalkylphosphonium salt ionic liquid is selected from the group consisting of trihexyltetradecylphosphonium chloride, trihexyltetradecylphosphonium bromide, and trihexyltetradecylphosphonium dicyanamide.

In embodiments, the phosphonium salt or ammonium salt ionic liquid is a tetraalkylammonium salt ionic liquid. In embodiments, the tetraalkylammonium salt ionic liquid comprises at least three $C_4$ to $C_{20}$ alkyl groups. In embodiments, the tetraalkylammonium salt ionic liquid comprises a hydrophilic counter ion. In embodiments, the hydrophilic counter ion is selected from the group consisting of $Cl^-$, $Br^-$, $(NC)_2N^-$, $SO_4^{2-}$. In embodiments, the tetraalkylammonium salt ionic liquid is N-methyl-N,N-dioctyloctan-1-ammonium chloride.

According to a fifth aspect, there is provided a Fe(III) ion laden organic phase obtained by the process of the first, third or fourth aspect or the use of the second aspect.

According to a fifth aspect, there is provided a composition comprising Fe(III) ions obtained by the process of the first, third or fourth aspect or the use of the second aspect.

BRIEF DESCRIPTION OF THE FIGURES

Embodiments of the present invention will be discussed with reference to the accompanying drawings wherein.

DESCRIPTION OF EMBODIMENTS

Figure 1:
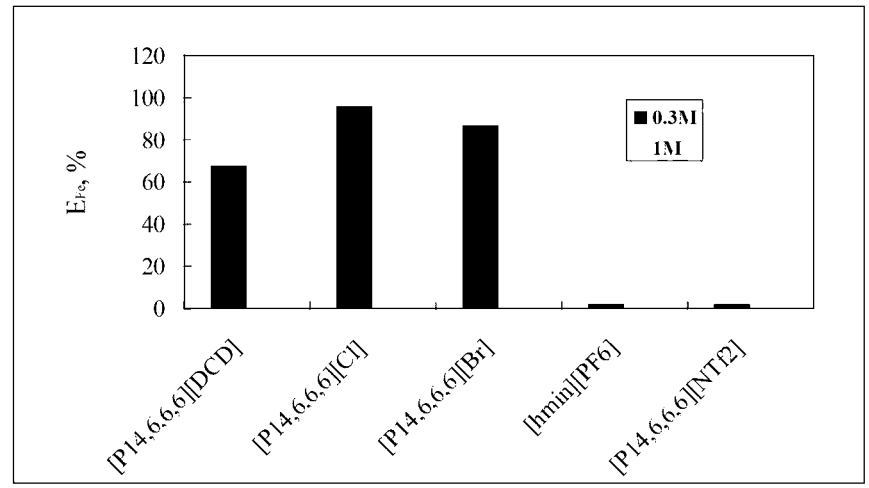
FIG. 1 shows a plot showing the extraction percentage of Fe(III) using various ionic liquids at different HCl concentrations.

The present invention arises from the surprising finding that phosphonium salt or ammonium salt ionic liquids, such as Cyphos IL 101 and Aliquat 336, can be used to selectively remove iron from coal gangue in hydrochloric acid leachate in a simple, quick and highly selective process.

Thus, provided herein is a process for selectively extracting Fe(III) ions from an aqueous feedstock containing Fe(III) ions and non-ferric ions. The method comprises contacting the feedstock with an organic phase comprising a phosphonium salt or ammonium salt ionic liquid under liquid-liquid extraction conditions for a time sufficient to allow transfer of at least some of the Fe(III) ions from the feedstock to the organic phase to provide an Fe(III) ion laden organic phase and an Fe(III) depleted feedstock. The Fe(III) ion laden organic phase is separated from the Fe(III) depleted feedstock. The feedstock may be any aqueous solution, suspension, emulsion, etc. containing Fe(III) ions and non-ferric ions. Examples of feedstocks include leachates, leach solutions, waste water, nuclear waste, reaction mixtures, etc.

Ionic liquids are widely used and known as a green solvents and have been used for metal ion extraction (Seddon 2000; Wei, Yang et al. 2003). Typically, ionic liquids are used as an alternative solvent in extractions using an organic extractant. The organic extractant is a metal chelator that forms neutral metal-organic complexes which have a higher solubility in the ionic liquid phase. Consequently, metal ions are extracted from the aqueous solution into the ionic liquid phase. For example, $[C_4mim][PF_6]$ was used as a solvent in liquid/liquid extraction of heavy metal ions such as Pb, Cd, Cr, Hg. Dithizone was employed as a metal chelator to form metal-dithizone complexes with heavy metal ions, which has the high distribution ratios between $[C_4mim][PF_6]$ and the aqueous phase (Wei, Yang et al. 2003).

Compared to imidazolium or pyridinium based counterparts, ionic liquids based on phosphonium and ammonium are more advantageous economically and have been produced in ton-scale for many years (Kogelnig; and Keppler 2011). Due to the hydrophobicity of Aliquat 336 (tricaprylmethylammonium chloride or methyltrioctylammonium chloride) and Cyphoss IL 101 (trihexyl(tetradecyl) phosphonium chloride), the formation of liquid-liquid biphasic systems with aqueous phases can be achieved, making them suitable for such extraction processes. It has been reported that Cyphoss IL 101 and Aliquat 336 have been successfully applied in solvent extraction, and have been found to function by an anion exchange mechanism. For example, Cyphoss IL 101 has been investigated as a new ionic liquid extracting agent and dissolved in chloroform to separate iron(III) from nickel(II) (Kogelnig, Stojanovic et al. 2010). It has also been studied as a novel extractant to extract uranium(VI) (Quinn, Ogden et al. 2013) and palladium(II) (Cieszynska and Wisniewski 2010) from their chloride solutions. Aliquat 336 was diluted with kerosene to extract Co(II) and Ni(II) from acidic sulfate solutions by solvent extraction. The extraction percent of each metal ion was found to increase with increasing pH and extractant concentration (Nayl, 2010). However, Cyphos IL 101 and Aliquat 336 were diluted in chloroform, toluene or kerosene rather than being used in a pure state. However, the organic solvents decrease the viscosity of the ionic liquid and, in doing so, the advantages of using ionic liquid for extraction are lost. Very recently, Sil wellens and his co-workers employed undiluted phosphonium ionic liquids for the separation of cobalt from nickel (Wellens, Thijs et al. 2012, Vander Hoogerstraete, Wellens et al. 2013, Wellens, Goovaerts et al. 2013).

In the processes described herein the ionic liquid acts as both an extractant and a solvent to separate iron and aluminium from coal gangue in hydrochloric acid leaching solutions. Thus, the feedstock is contacted with the ionic liquid under liquid-liquid extraction conditions for a time sufficient to allow transfer of at least some of the Fe(III) ions from the feedstock to the organic phase. As used herein, the terms "ionic liquid", "IL", and similar terms, mean a salt consisting of a bulky, asymmetric organic cation and a smaller anion. "Room temperature ionic liquids" or "RTILs" are liquids at relatively low temperatures (egg below about 100° C.). A range of ILs are available commercially or can be synthesised using known methods.

In embodiments, the phosphonium salt or ammonium salt ionic liquid is a tetraalkylphosphonium salt ionic liquid. In embodiments, the tetraalkylphosphonium salt ionic liquid comprises at least three $C_4$ to $C_{20}$ alkyl groups. In embodiments, the tetraalkylphosphonium salt ionic liquid comprises a hydrophilic counter ion. In embodiments, the hydrophilic counter ion is selected from the group consisting of $Cl^-$, $Br^-$, $(NC)_2N^-$, $SO_4^{2-}$. We have found that the anion type plays an important role in extraction efficiency and selectivity of iron from aqueous solutions. ILs having more hydrophilic anions show a better ability to extract Fe(III) ions. In embodiments, the tetraalkylphosphonium salt ionic liquid is selected from the group consisting of trihexyltetradecylphosphonium chloride, trihexyltetradecylphosphonium bromide, trihexyltetradecylphosphonium dicyanamide, tributyl(methyl)phosphonium bromide, tributyl(methyl)phosphonium chloride, tributyl(hexyl)phosphonium bromide, tributyl(hexyl)phosphonium chloride, tributyl(octyl)phosphonium bromide, tributyl(octyl)phosphonium chloride, tributyl(decyl)phosphonium bromide, tributyl(decyl)phosphonium chloride, tetrabutylphosphonium bromide, and tetrabutylphosphonium chloride. In specific embodiments, the tetraalkylphosphonium salt ionic liquid is selected from the group consisting of trihexyltetradecylphosphonium chloride, trihexyltetradecylphosphonium bromide, and trihexyltetradecylphosphonium dicyanamide.

In embodiments, the phosphonium salt or ammonium salt ionic liquid is a tetraalkylammonium salt ionic liquid. In embodiments, the tetraalkylammonium salt ionic liquid comprises at least three $C_4$ to $C_{20}$ alkyl groups. In embodiments, the tetraalkylammonium salt ionic liquid comprises a hydrophilic counter ion. In embodiments, the hydrophilic counter ion is selected from the group consisting of $Cl^-$, $Br^-$, $(NC)_2N^-$, $SO_4^{2-}$. In embodiments, the tetraalkylammonium salt ionic liquid is N-methyl-N,N-dioctyloctan-1-ammonium chloride.

The IL may be a pure or semi-pure IL. The RTIL is substantially free of an extraneous organic extractant, the significance of which will be described in more detail later.

The feedstock can be contacted with the organic phase using any apparatus or technique suitable for liquid-liquid extraction. For example, the feedstock may be contacted with the organic phase by combining the two phases in a suitable vessel and mixing to at least partially disperse the phases in one another. The time taken for mixing will vary depending on the feedstock, the particular ionic liquid used, the temperature, etc. Processes for bulk phase solvent extraction are known in the art.

Alternatively, the feedstock and the organic phase may be mixed in a microfluidic liquid-liquid extraction device. The microfluidic liquid-liquid extraction device may be as described in published application WO 2010/022441 titled "Extraction Processes" (the disclosure of which is incorporated herein in its entirety) and/or in published application WO 2012/075527 titled "High Throughput Microfluidic Device" and/or using any of the microfluidic separation techniques known in the art.

After the feedstock and the organic phase have been contacted with one another for a time sufficient to allow transfer of at least some of the Fe(III) ions from the feedstock to the organic phase, the Fe(III) ion laden organic phase is separated from the Fe(III) ion depleted feedstock. In most cases, the two phases are physically separated from one another using any of the techniques known for that purpose in the art.

The process may further comprise treating the feedstock to increase the concentration of inorganic anions in the feedstock prior to contact with the organic phase. In embodiments, the "inorganic anion" is selected from the group consisting of: halide ion, thiocyanate ion, thiosulfate ion, nitrate ion, and perchlorate ion. In some embodiments, the halide ion is selected from iodide, bromide, chloride, and fluoride. In some specific embodiments, the halide ion is chloride.

The concentration of inorganic anions in the feedstock can be increased by adding a source of inorganic anions. A salt containing the inorganic anion can be added to the feedstock. For example, the concentration of halide ion in the aqueous feedstock can be increased by adding a halide salt to the feedstock. In the case of chloride, suitable halide salts include HCl, KCl, NaCl, $NH_4Cl$, etc. Equivalent iodide, bromide, fluoride, thiocyanate, nitrate or perchlorate salts could be used.

In some specific embodiments, the process comprises treating the aqueous feedstock with HCl to increase the chloride concentration in the feedstock prior to contact with the RTIL. The amount of HCl added to the feedstock may depend on the target metal and/or the RTIL used. In some embodiments, the aqueous feedstock is from about 0.01 $mol \cdot L^{-1}$ to about 10 $mol \cdot L^{-1}$ HCl. In some specific embodiments, the aqueous feedstock is from about 0.01 $mol \cdot L^{-1}$ to about 0.090 $mol \cdot L^{-1}$ HCl. In some other specific embodiments, the aqueous feedstock is from about 1 $mol \cdot L^{-1}$ to about 9 $mol \cdot L^{-1}$ HCl. In some other specific embodiments, the aqueous feedstock is from about 2 $mol \cdot L^{-1}$ to about 4 $mol \cdot L^{-1}$ HCl. In some other specific embodiments, the aqueous feedstock is from about 6 $mol \cdot L^{-1}$ to about 9 $mol \cdot L^{-1}$ HCl. In some other specific embodiments, the aqueous feedstock is about 0.02 $mol \cdot L^{-1}$ HCl. In some other specific embodiments, the aqueous feedstock is about 3 $mol \cdot L^{-1}$ HCl. In some other specific embodiments, the aqueous feedstock is about 7 $mol \cdot L^{-1}$ HCl.

After separating the Fe(III) ion laden organic phase from the Fe(III) ion depleted feedstock, the Fe(III) can be recovered from the organic phase. Methods for recovering metal ions or metals from solvents or solution are known in the art and can be used in the processes of the present invention. For example, at least some of the Fe(III) ions can be removed from the organic phase by contacting the Fe(III) ion laden organic phase with an aqueous solution under conditions to allow at least some of the Fe(III) ions from the Fe(III) ion laden organic phase to transfer to the aqueous solution. Advantageously, we have found that water and aqueous sulphuric acid give high extraction efficiencies when they are used to strip Fe(III) ions from the Fe(III) ion laden organic phase. For example, 0.5 $mol \cdot L^{-1}$ $H_2SO_4$ is an efficient stripping solution which enables nearly 100% of Fe(III) ions to be extracted from the Fe(III) ion laden organic phase after three steps of stripping. 92.51% of Fe(III) ions can be stripped after three steps of stripping with water. Hydrochloric acid is the least effective stripping solution. After three stripping steps with $H_2SO_4$, the ionic liquid can be reused to extract efficiently a new load of Fe(III) from an aqueous solution. Compared with Cyphos IL101, iron is more easily stripped from Fe-loaded Aliquat 336 than Fe-load Cyphos IL 101.

After separating the Fe(III) ion laden organic phase from the Fe(III) ion depleted feedstock, Al or other non-ferric ions of interest such as Na, Ca or Mg can be recovered from the Fe(III) ion depleted feedstock. It will be appreciated that the Al present in the Fe(III) ion depleted feedstock contains low levels of iron and can, therefore, be used to produce high purity and/or commercially acceptable aluminium substrates.

Also provided herein is a use of a phosphonium salt or ammonium salt ionic liquid for selectively extracting Fe(III) ions from an aqueous feedstock containing Fe(III) ions and non-ferric ions comprising contacting the feedstock with an organic phase comprising the phosphonium salt or ammonium salt ionic liquid under liquid-liquid extraction conditions for a time sufficient to allow transfer of at least some of the Fe(III) ions from the feedstock to the organic phase to provide a Fe(III) ion laden organic phase and an Fe(III) depleted feedstock, and separating the Fe(III) ion laden organic phase from the Fe(III) depleted feedstock.

As discussed, the processes described herein may be particularly suitable for removing Fe(III) ions from coal gangue leachate. Therefore, provided herein is a process for selectively removing Fe(III) ions from a coal gangue leachate, the method comprising contacting the leachate with an organic phase comprising a phosphonium salt or ammonium salt ionic liquid under liquid-liquid extraction conditions for a time sufficient to allow transfer of at least some of the Fe(III) ions from the leachate to the organic phase to provide a Fe(III) ion laden organic phase and an Fe(III) depleted leachate, and separating the Fe(III) ion laden organic phase from the Fe(III) depleted leachate.

Fe(III) ions can then be stripped from the Fe(III) ion laden organic phase and high purity aluminium products can be recovered from the Fe(III) depleted leachate. Thus, also provided herein is a process for recovering high purity aluminium products, such as aluminium chloride, from coal gangue, the process comprising leaching the coal gangue to provide a leachate, contacting the leachate with an organic phase comprising a phosphonium salt or ammonium salt ionic liquid under liquid-liquid extraction conditions for a time sufficient to allow selectively transfer of at least some of the Fe(III) ions from the leachate to the organic phase to provide a Fe(III) ion laden organic phase and an Fe(III) depleted leachate, separating the Fe(III) ion laden organic phase from the Fe(III) depleted leachate, and recovering aluminium products from the Fe(III) depleted leachate.

The invention is hereinafter described by way of the following non-limiting examples.

EXAMPLES

Reagents

All ILs used in this work were purchased from IoLi Tec, Germany. Analytical ferric chloride hexahydrate ($FeCl_3 \cdot 6H_2O$, 98%), aluminium chloride hexahydrate ($AlCl_3 \cdot 6H_2O$, 98%), hydrochloric acid (HCl, 37%), nitric acid ($HNO_3$), sodium chloride (NaCl), lithium chloride (LiCl) were purchased from Sigma-Aldrich. Deionized water (Resistivity 18.2 MΩ·cm) was obtained from a Millipore water system (Advantage A10, Merck Millipore, Germany). Five types of ionic liquids used are listed in the table below:

TABLE 1

Ionic liquids used in this study (Kevin J. Fraser 2009)

| ILs | Abbreviation | Molecular Structure | Molecular Weight | Density (g·ml$^{-1}$, 25° C.) | Viscosity (25° C., mPa·s) |
|---|---|---|---|---|---|
| 1-Hexyl-3-methylimidazolium hexafluorophosphate | [Hmin][$PF_6$] | (imidazolium cation with $CH_3$ and $CH_2(CH_2)_4CH_3$ substituents; $PF_6^-$ anion) | 312.23 | 1.30 | 585 |
| Trihexyltetradecylphosphonium bis(trifluoromethylsulfonyl)amide | [$P_{14,6,6,6}$][$NTf_2$] | $H_3C(H_2C)_5$—$P^+$—$(CH_2)_{13}CH_3$ with three $(CH_2)_5CH_3$ groups; $F_3CO_2S$—$N^-$—$SO_2CF_3$ | 763.24 | 1.07 | — |
| Trihexyltetradecylphosphonium Bromide | [$P_{14,6,6,6}$][Br] | $H_3C(H_2C)_5$—$P^+$—$(CH_2)_{13}CH_3$ with three $(CH_2)_5CH_3$ groups; $Br^-$ | 563.76 | 0.96 | 2094 |
| Trihexyltetradecylphosphonium Dicyanamide | [$P_{14,6,6,6}$][DCD] | $H_3C(H_2C)_5$—$P^+$—$(CH_2)_{13}CH_3$ with three $(CH_2)_5CH_3$ groups; NC—$N^-$—CN | 557 | 0.90 | 256 |
| Trihexyltetradecylphosphonium Chloride | [$P_{14,6,6,6}$][Cl], Cyphos IL 101 | $H_3C(H_2C)_5$—$P^+$—$(CH_2)_{13}CH_3$ with three $(CH_2)_5CH_3$ groups; $Cl^-$ | 519.31 | 0.90 | 1824 |
| Tricaprylylmethylammonium chloride (mixture of $C_8$-$C_{10}$ $C_8$ is dominant) | [$N_{8,8,8,1}$][Cl], Aliquat 336 | $CH_3(CH_2)_6CH_2$—$N^+$—$CH_2(CH_2)_6CH_3$ with $CH_3$ and $CH_2(CH_2)_6CH_3$ groups; $Cl^-$ | 404.16 | 0.884 | 1500 at 30° C. |

Instruments and Measurement Methods

Metal ion concentrations in the aqueous phase were determined using inductively coupled plasma optical emission spectroscopy (ICP-AES, Perkin Elmer-optima 5300 DV). Samples for iron determination were acidified with 0.1 mol·L$^{-1}$ $HNO_3$. The analytical error for Fe based on duplicate analysis was ±1% at the 102% confidence level.

FT-IR and Raman spectroscopy were used to characterise the structure of the ionic liquids before and after extraction. Infrared spectra were recorded in attenuated total reflection (ATR) mode on a Thermo Nicolet FT-IR Nexus 470. Before IR measurements, the samples were washed three times with deionised water to remove extracted acid in the ionic liquid phase and then evaporated under vacuum to remove water remaining in the ionic liquid. Raman spectroscopy was performed on an Alpha300R microscopy/spectroscopy (Witec, Germany). The system had a 532 nm diode laser for sample illumination with a 1 cm$^{-1}$ resolution and a thermo-electric cooled CCD detector. The acquisition time for a single Raman spectrum was 10 s.

The forms of iron species present in the ionic liquid phase and aqueous solution were qualitatively measured using a UV-Visible spectrophotometer (SHIMADZU UV-2600). The absorption was collected using a 1.0 cm$^2$ quartz cuvette at room temperature in the wavelength range from 200-900 nm. For each sample, the spectrum of an Fe-free blank solution was collected before measuring the Fe-bearing solutions. For the measurement of iron species in the ionic liquid phase in the wavelength range between 200 to 500 nm, ethanol was used to dilute ionic liquids, which has an UV absorption cut-off at the wavelength of 210 nm.

Extraction Methods

All stock solutions were prepared with ultra pure water. For the effect of acid concentrations on iron extraction, the solutions were prepared by adding different volumes of concentrated HCl (37%, 1.18 g·mL$^{-1}$). For the effect of chloride concentrations on iron extraction, the solutions were prepared by adding different amount of NaCl or LiCl, and acid concentration was kept at 1 mol·L$^{-1}$. To determine the extraction efficiency as a function of the iron concentration present in the feed solution, an aqueous solution of Fe(III) with a hydrochloric acid content of 3 mol·L$^{-1}$ with the iron concentration from 4.5 to 72 g·L$^{-1}$ was prepared. To examine the extraction selectivity of Fe(III) from Al(III) solution, the extraction was performed with feed aqueous solutions of different molar ratios Al(III)/Fe(III) under two acid concentrations, 3 mol·L$^{-1}$ and 7 mol·L$^{-1}$. 1 ml of each IL was used in the extraction process. 1 mL of undiluted ionic liquid was used as the extraction phase and was measured by the equivalent mass on a balance according to the densities in Table 1. The Fe(III) extraction was carried out at room temperature (25±2° C.) at a RTIL/water volume ratio of 1:2. Before extraction, 1 mL of RTIL was saturated with water at the extraction pH, which was then brought into contact with 2 mL of aqueous phase containing metal ions. The solution was mixed vigorously for 30 min using a magnetic stirring apparatus (RT 10, IKA). Phase separation was achieved by centrifugation at 4000 rpm for 5 min (2-16p, Sigma). The effect of contact time on extraction efficiency was studied by varying the mixing time while the remaining experimental conditions were kept constant.

After the phase separation, the metal ion concentration in the aqueous phase was determined via ICP. The extraction efficiency, distribution ratio and separation factor of metal ions were determined. The extraction percentage (E) of a metal is defined as $$\% E = \frac{[M]_0 - [M]_{aq}}{[M]_0} \times 100$$

where $[M]_0$ and $[M]_{aq}$ denote metal concentrations in the aqueous phase before and after extraction (g·L$^{-1}$).

The distribution ratio (D)) of a metal was calculated using the equation given below:

$$D = \frac{[M]_0 - [M]_{aq}}{[M]_{aq}} \times \frac{V_{aq}}{V_{org}}$$

where $V_{aq}$ and $V_{org}$ are the volumes of the aqueous phase and the ionic liquid phase (mL).

The separation factor a expresses the efficiency of a separation between two metals, and it can be defined as $$a_{M_1, M_2} = \frac{D_{M_1}}{D_{M_2}}$$

where $D_{M_1}$ and $D_{M_2}$ are the distribution ratios of metal $M_1$ and $M_2$, respectively.

Forms of Fe(II) Complexes in Acid Chloride Solutions

Forms of Fe(III) species in aqueous solutions with increasing Cl$^-$ concentrations from 1 to 13 mol·L$^{-1}$ were investigated. The solutions were prepared with LiCl, FeCl$_3$.6H$_2$O and HCl. Fe(III) concentration in each solution was about 0.4 mmol·L$^{-1}$ (because Fe(III) species have strong absorptions in the ultraviolet region, Fe(III) concentrations higher than this could achieve saturated absorption). The total chloride and iron concentrations of the sample solutions used in this study are listed in Table 2.

TABLE 2

Compositions of sample solutions used in the measurement of UV spectra

| Group | No. | Fe(III) (mmol · L$^{-1}$) | Li(I) (mol · L$^{-1}$) | HCl (mol · L$^{-1}$) | Cl(I) (mol · L$^{-1}$) |
|---|---|---|---|---|---|
| 1 | 1 | 0.41 | 0 | 1 | 1 |
|   | 2 | 0.44 | 2 |   | 3 |
|   | 3 | 0.43 | 4 |   | 5 |
|   | 4 | 0.40 | 6 |   | 7 |
|   | 5 | 0.44 | 8 |   | 9 |
|   | 6 | 0.44 | 10 |   | 11 |
|   | 7 | 0.38 | 12 |   | 13 |
| 2 | 1 | 0.41 | 0 | 6 | 6 |
|   | 2 | 0.43 | 0 | 8 | 8 |
|   | 3 | 0.40 | 0 | 10 | 10 |
|   | 4 | 0.43 | 0 | 12 | 12 |

Stripping Methods

Loaded organic phase was stripped with various stripping solutions including water, 0.5 mol·L$^{-1}$ HCl, 1 mol·L$^{-1}$ HCl, 0.1 mol·L$^{-1}$ H$_2$SO$_4$, 0.5 mol·L$^{-1}$ H$_2$SO$_4$, 1 mol·L$^{-1}$ H$_2$SO$_4$. The volume ratio of stripping solution to Fe(III)-loaded organic phase was 4:1. The stripping experiment was repeated four times consecutively using fresh stripping solution and the data reported are their average values. After vigorous stirring at 1000 rpm for 30 mins at 25±2° C., the two phases were separated by centrifugation at 4000 rpm for 5 min. The iron concentration in the aqueous phase was measured using ICP. The stripping percentage (S) of Fe(III) is defined as $$\% S = \frac{V_s \times [Fe]_s}{V_o \times [Fe]_o} \times 100$$

where $V_S$ and $V_O$ denote the volumes of the stripping solution and Fe(III)-loaded organic phase (mL). $[Fe]_o$, denotes Fe(III) concentration in the organic phase before stripping (g·L$^{-1}$). $[Fe]_s$ denotes the Fe(III) concentration in the aqueous phase after stripping (g·L$^{-1}$).

Example 1—Extraction of Iron from Aqueous Solutions Using Phosphonium RTILs

Effect of HCl Concentration on Efficiency of Iron Extraction

The extraction of iron at two different concentrations of HCl with various ionic liquids was carried out. The extraction efficiency (% E) is shown in FIG. 1. The results show that [P$_{14,6,6,6}$][Cl], [P$_{14,6,6,6}$][Br] and [P$_{14,6,6,6}$][DCD] can extract Fe(III) to a large extent from the aqueous solutions at HCl concentrations of 0.3 mol·L$^{-1}$ and 1 mol·L$^{-1}$. Among those, [P$_{14,6,6,6}$][C] extracted higher than 95% of iron from both 0.3 mol·L$^{-1}$ and 1 mol·L$^{-1}$ HCl solutions; while the extraction percentage of iron for [P$_{14,6,6,6}$][Br] and [P$_{14,6,6,6}$][DCD] was dependent on the acid concentrations, where higher acid concentration in the aqueous solution gave rise to a higher extraction efficiency. However, [Hmin][PF$_6$] and [P$_{14,6,6,6}$][NTf$_2$] extracted only a very low percentage of Fe(III).

Effect of Cl$^-$ Concentration on Efficiency of Iron Extraction

Figure 2:
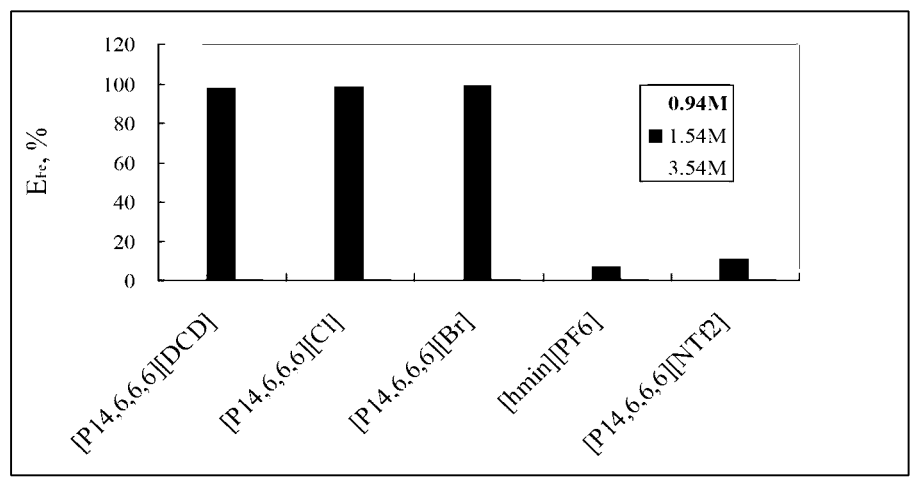
FIG. 2 shows a plot showing the extraction percentage of Fe(III) with various ionic liquids at different concentrations of $Cl^-$.

The extraction of iron at three different concentrations of Cl$^-$ with various ionic liquids was carried out. The extraction efficiency (% E) is shown in FIG. 2. The results show that the extraction efficiency for iron increased with increasing Cl⁻ concentration for all RTILs selected. [$P_{14,6,6,6}$][Cl], [$P_{14,6,6,6}$][Br] and [$P_{14,6,6,6}$][DCD] extracted Fe(III) efficiently from 0.3 mol·L⁻¹ HCl solutions at different concentrations of Cl⁻. However, [Hmin][$PF_6$] only extracted iron around 20% and [$P_{14,6,6,6}$][$NTf_2$] about 10% at 3.54 mol·L⁻¹ of Cl⁻ concentration.

The above results indicate that the anion of the ILs plays an important role in extraction efficiency and selectivity of iron from aqueous solutions. ILs involving in more hydrophilic anions show better ability to extract Fe.

Example 2—Extraction of Aluminium from Aqueous Solutions Using Phosphonium RTILs ILs were also evaluated as extractants for Al(III) extraction and the results are shown in Table 3. The results show that Al(III) cannot be extracted from aqueous chloride solutions using phosphonium ionic liquids under the selected experiment conditions.

TABLE 3

Extraction of Al(III) with various ionic liquids at different concentrations of Cl⁻ in 0.3 mol·L⁻¹ HCl solution

| ILs | [Cl⁻] (mol·L⁻¹) | [Al(III)]₀ (mg·L⁻¹) | [Al(III)]$_{aq.}$ (mg·L⁻¹) | $E_{Al}$, % |
|---|---|---|---|---|
| [$P_{14,6,6,6}$][DCD] | 2.65 | 12119 | 11800 | 2.63 |
|  | 4.65 |  | 11500 | 5.11 |
| [$P_{14,6,6,6}$][Cl] | 2.65 |  | 12000 | 0.98 |
|  | 4.65 |  | 12000 | 0.98 |
| [$P_{14,6,6,6}$][Br] | 2.65 |  | 11600 | 4.28 |
|  | 4.65 |  | 11600 | 4.28 |

Example 3—Extraction of Iron from Iron and Aluminium Mixed Aqueous Solutions Using Phosphonium RTILs Three phosphonium ionic liquids trihexyltetradecylphosphonium chloride [$P_{14,6,6,6}$][Cl], trihexyltetradecylphosphonium bromide ([$P_{14,6,6,6}$][Br]) and trihexyltetradecylphosphonium dicyanamide [$P_{14,6,6,6}$][DCD] were tested to extract iron from a mixed solution containing 12.15 g·L⁻¹ (0.45 mol·L⁻¹) of aluminium and 4.48 g·L⁻¹ (0.08 mol·L⁻¹) of iron at 1 HCl solution. The concentrations of aluminium (III) and iron(III) in the aqueous phase after extraction, the distribution coefficients and separation factors are given in Table 4.

TABLE 4

Extraction results with three phosphonium ionic liquids as extraction phases

|  | [$P_{14,6,6,6}$][Cl] | [$P_{14,6,6,6}$][Br] | [$P_{14,6,6,6}$][DCD] |
|---|---|---|---|
| [Fe]$_{aq}$(mg·L⁻¹) | 29 | 37 | 27 |
| [Al]$_{aq}$(mg·L⁻¹) | 11500 | 11000 | 11000 |
| % $E_{Fe}$ | 99.4 | 99.2 | 99.4 |
| $D_{Fe}$ | 308.4 | 241.3 | 331.4 |
| $D_{Al}$ | 0.1 | 0.2 | 0.2 |
| $a_{Fe, Al}$ | 3084 | 1206 | 1657 |

The results show that more than 99% of Fe(III) was extracted using the three ionic liquids, while the majority of Al(III) remained in the aqueous phase. A separation factor of 3084 was achieved for [$P_{14,6,6,6}$][Cl], 1206 for [$P_{14,6,6,6}$][Br] and 1657 for [$P_{14,6,6,6}$][DCD], respectively. Both [$P_{14,6,6,6}$][Br] and [$P_{14,6,6,6}$][DCD] have comparable results to that of [$P_{14,6,6,6}$][P Cl], however, bromide is more toxic than chloride. In addition [$P_{14,6,6,6}$][Cl] will not introduce extra anions to the aqueous phase given that HCl leaching process was employed. As for [$P_{14,6,6,6}$][DCD], the partial formation of emulsions was observed after extraction at liquid-liquid interface. [$P_{14,6,6,6}$][Cl] was then selected for further work.

Example 4—Extraction of Iron from Aqueous Solutions Using Cyphos IL 101

Effect of HCl Concentration on Extraction Efficiency

Figure 3:
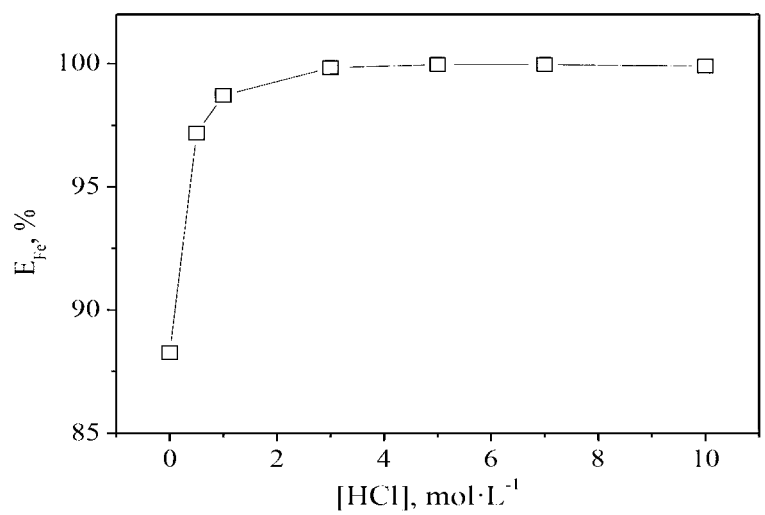
FIG. 3 shows a plot showing the effect of HCl concentration on extraction of Fe(III) from chloride media using Cyphos IL 101 (Aqueous solutions: 13.5 g·L$^{-1}$ Fe(III), 0-10 mol·L$^{-1}$ HCl)

The effect of HCl concentration within the range of 0 to 10 mol·L⁻¹ at a constant Fe(III) concentration of 0.24 mol·L⁻¹ (13.5 g·L⁻¹) in the feed solution on the extraction of Fe(III) was investigated. The results are shown in FIG. 3. The Fe(III) extraction percentage increased from 88.3% to 99.7% at HCl concentrations ranging from 0 to 10 mol·L⁻¹.

Effect of Cl⁻ Concentration on Extraction Efficiency

Figure 4:
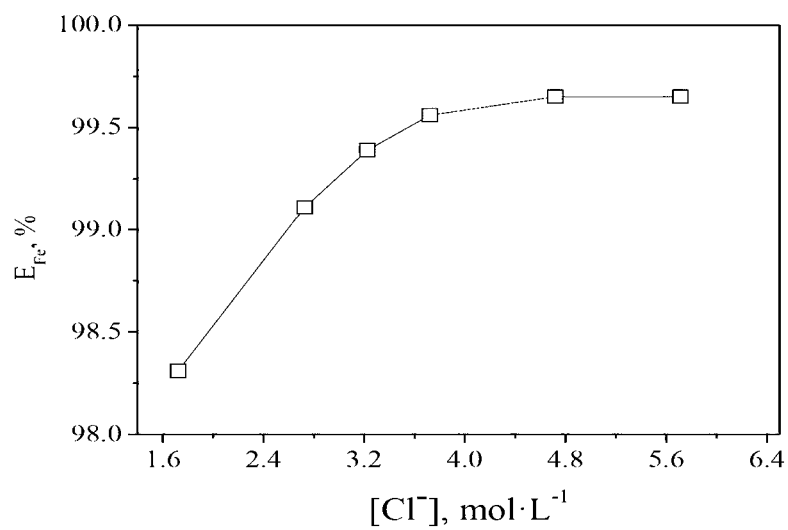
FIG. 4 shows a plot showing the effect of $Cl^-$ concentration on the extraction of Fe(III) from chloride media using Cyphos IL 101 (Aqueous solutions: 13.5 g·L$^{-1}$ Fe(III), 1 mol·L$^{-1}$ HCl, 1.72-5.72 mol·L$^{-1}$ $Cl^-$, NaCl as chloride source, [$Cl^-$] is the sum of the $Cl^{-1}$ in the aqueous solution from NaCl, HCl and FeCl$_3$)

When varying HCl concentrations, both solution acidity and chloride concentration are changing. In order to study the effect of Cl⁻ concentration on iron(III) extraction, the Cl⁻ concentrations were adjusted by adding required amounts of NaCl in the feed solutions, while the HCl concentration was fixed at 1 M. The extraction of 13.5 g·L⁻¹ Fe(III) in the feed solutions was then studied by varying Cl⁻ concentrations in the range of 1.72 mol·L⁻¹ to 5.72 mol·L⁻¹. The results are shown in FIG. 4. With the increase of chloride concentration, the extraction percentage of Fe(III) increased from 98.3 to 99.7%. The influence of NaCl concentrations on Fe(III) extraction had the same trend as that of HCl, showing that NaCl can be used as a chloride source to enhance Fe(III) extraction. This shows that highly efficient extraction of Fe(III) using Cyphos IL 101 can be achieved at lower acid concentration media, while high concentration of HCl is needed when organic phosphine such as TBP, Cyanex 921 and Cyanex 923 are used to extract Fe(III) from acid chloride solutions (Mishra, et al., 2010). Without being bound by theory, we propose that chloride ion concentrations in the feed solutions play a role in Fe(III) extraction, while the hydrolysis of Fe(III) is depressed by the acidity of the solutions.

Effect of Agitation Time

Figure 5:
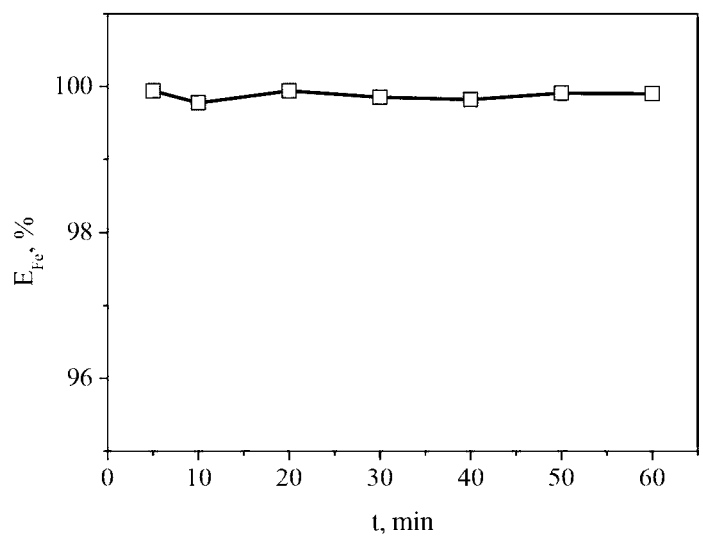
FIG. 5 shows a plot showing the effect of time on the extraction of Fe(III) from chloride media using Cyphos IL 101 (Aqueous solutions: 13.5 g·L$^{-1}$ Fe(III), 3 mol·L$^{-1}$ HCl)
Figure 6:
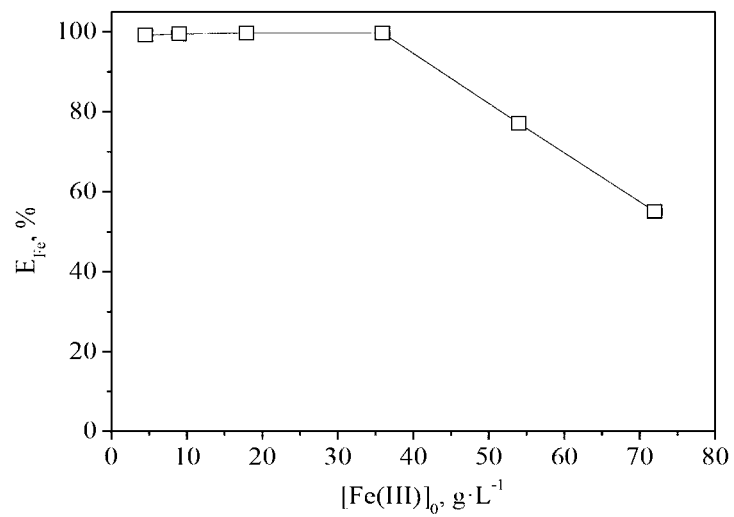
FIG. 6 shows a plot showing the extraction efficiency as a function of iron concentration in feed solutions comprising 4.5-72 g·L$^{-1}$ Fe(III) and 3 mol·L$^{-1}$ HCl.

To study the effect of mixing time on the extraction of Fe(III), an aqueous chloride solution containing 13.5 g·L⁻¹ Fe(III), 3 mol·L⁻¹ HCl and Cyphos IL 101 were contacted at a 2:1 volume ratio for various mixing time from 0 min to 60 min. As shown in FIG. 5, Fe(III) extraction with Cyphos IL 101 was very fast, with more than 99.5% of Fe(III) extracted within 5 min. In addition, phase separation was fast without the formation of emulsions. On the contrary, the formation of a third phase was generally encountered especially in HCl media during conventional solvent extraction where organic extractants and dilutes were applied (Zhu, 2005).

Effect of Fe(III) Concentration

The Fe(III) extraction as a function of Fe(III) concentration in feed solutions was determined. Fe(III) extraction percentage keeps almost constant when the Fe(III) concentration is below 36 g·L⁻¹, and it decreases sharply with increasing Fe(III) content in the feedstock. At less than 36 g·L⁻¹, Fe(III) in the solution was almost entirely extracted, whereas at 72 g·L⁻¹ Fe(III) extraction percentage was 52.8%. This is because a Fe(III) concentration above 36 g·L⁻¹ leads to a maximum loading in Cyphos IL 101.

Figure 7:
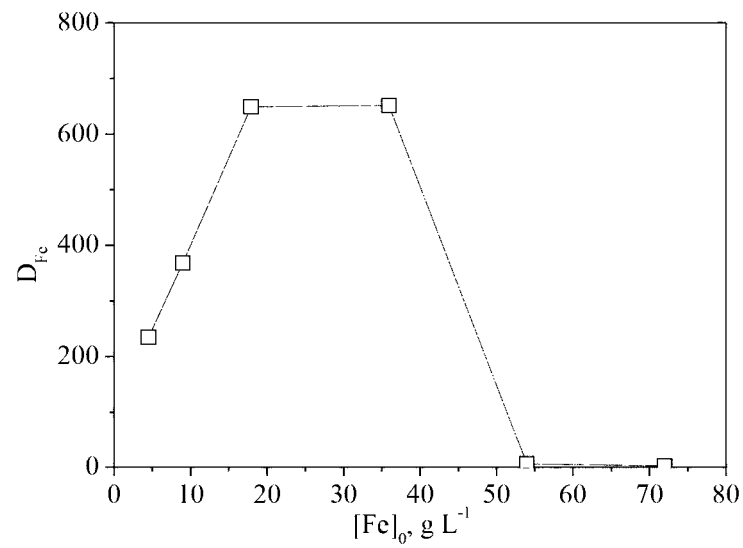
FIG. 7 shows a plot showing the distribution coefficient ($D_{Fe}$) as a function of the iron concentration in feed solutions comprising 4.5-72 g·L$^{-1}$ Fe(III) and 3 mol·L$^{-1}$ HCl.

The corresponding distribution coefficients ($D_{Fe}$) were calculated and are shown in FIG. 7. $D_{Fe}$ was found to increase first when the Fe(III) concentration is below 36 g·L⁻¹ and decreases distinctly after that. This is due to the influence of the salting-out effect of $FeCl_3$ in the solution below 36 g·L$^{-1}$. Increasing the Fe(III) concentration above 36 g·L$^{-1}$ leads to a maximum loading of Fe(III) in Cyphos IL 101.

Isotherm of Iron Extraction

Figure 8:
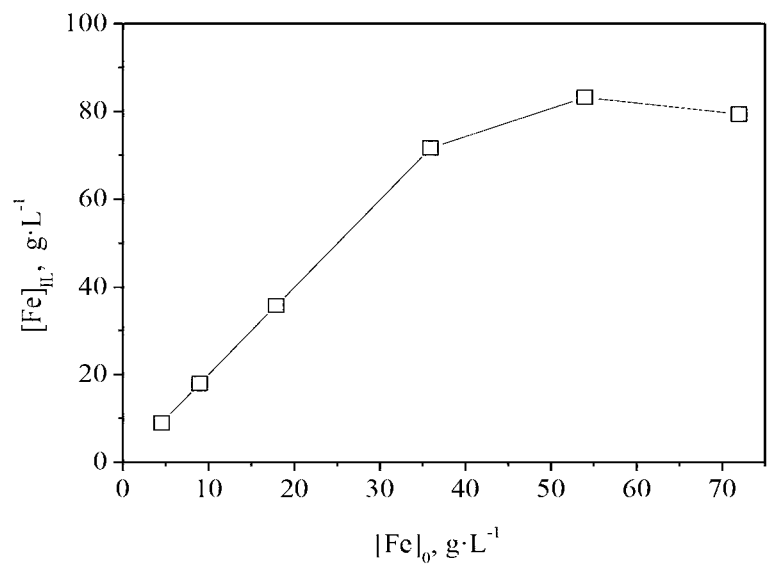
FIG. 8 shows a plot showing the extraction isotherm of Fe(III) using Cyphos IL101 and feed solutions comprising 4.5-72 g·L$^{-1}$ Fe(III), 3 mol·L$^{-1}$ HCl.

The isotherm of Fe(III) extraction from 3 mol·L$^{-1}$ of HCl feed solution was investigated. 1 mL of Cyphos IL 101 was used, while the Fe(III) concentrations in 2 mL of 3 mol·L$^{-1}$ HCl aqueous solution were varied from 4.5 to 72 g·L$^{-1}$. The concentrations of Fe(III) in Cyphos IL 101 phase against those in the aqueous phase were plotted and shown in FIG. 8. It can be seen that the loading of Fe(III) in Cyphos IL 101 increased with the increase of Fe(III) concentrations and then reached a maximum. The maximum loading of Fe(III) in Cyphos IL 101 was calculated at about 83.2 g·L$^{-1}$, which is equivalent to $1.49 \times 10^{-3}$ mole of Fe (III). As 1 mL of Cyphos IL 101 is equal to $1.64 \times 10^{-1}$ mole of Cyphos IL 101, the molar ratio of Fe(III) to Cyphos IL 101 is about 0.91. It has been reported that HCl can be extracted in the Cyphos IL 101 phase and present in the form of $[HCl_2]^-$ (Wellens, Thijs, et. al., 2012). Water can interact with Cyphos IL 101 via the formation of a weak hydrogen bond between the Cl$^-$ anion of Cyphos IL 101 and water molecules. The excess of the Cyphos IL 101 is thus assumed to be occupied by HCl and water due to their co-extraction with Fe (III). The maximum loading of Fe(III) can be affected by the co-extraction of acid.

Example 5—Selective Extraction of Fe (III) from Mixed Solutions Containing Different Metal Ions The major metal ions present in HCl leach solution from coal gangue include Al(III), Mg(II), Ca(II) and K(I), apart from Fe(III). To examine the extraction selectivity of Fe(III) from Al (III) solution, the extraction was performed with feed aqueous solutions of different molar ratios Al(III)/Fe (III) under 3 mol·L$^{-1}$ HCl. The Fe(III) concentration was kept at 13.5 g·L$^{-1}$. The remaining Fe(III) and Al (III) concentration and distribution coefficient, as well as separation factor, are listed in Table 5.

TABLE 5

Results of selectively extraction of Fe(III) from mixture solutions of different [Fe(III)]/[Al(III)]

| [Al(III)]/[Fe (III)] | [HCl], (mol · L$^{-1}$) 3 | | | | |
|---|---|---|---|---|---|
| | 0 | 0.2 | 0.5 | 1 | 3 |
| $[Fe(III)]_{aq}$ (mg · L$^{-1}$) | 28.4 | 28.5 | 16.9 | 12.0 | 6.5 |
| $[Al(III)]_{aq}$ (mg · L$^{-1}$) | 0 | 2280 | 5510 | 11020 | 34390 |
| $D_{Fe}$ (mg · L$^{-1}$) | 898 | 900 | 1517 | 2141 | 3975 |
| $D_{Al}$ (mg · L$^{-1}$) | | 0.35 | 0.43 | 0.43 | 0.34 |
| $a_{Fe, Al}$ | | 2578 | 3541 | 5048 | 11760 |

The distribution coefficient of Fe(III) is large, indicating Fe(III) was largely extracted into Cyphos IL 101, while Al(III) has a very small distribution coefficient, implying that most of the Al(III) remained in the aqueous phase. Cyphos IL 101 is thus a highly selective extractant to separate Fe(III) from Al(III). Furthermore, the distribution coefficient and separation factor of Fe(III) increased significantly with the concentration increase of Al(III), which can be attributed to the salting-out effect during liquid-liquid extraction. It has been reported that Al(III) can have a strong salting-out effect due to its smaller ionic radii and higher charge. Furthermore, the presence of Al(III) in the aqueous phase can decrease the dielectric constant of the aqueous phase and thus depress Fe(III) hydration, which can further enhance Fe(III) extraction (Yu and Wu, 1986).

The extraction of Fe(III) from mixed solutions containing Mg(II), Ca(II) and K(I) was further carried out in 3 mol·L$^{-1}$ HCl solutions. The results shown in Table 6 indicate that Mg(II), Ca(II) and K(I) are hardly extracted by Cyphos IL 101. The presence of these metal ions in the solution did not interfere with the extraction of Fe(III) and, on the contrary, they enhanced the extraction of Fe(III) due to salting out effect. Thus, it was found that magnesium, calcium and potassium remained in the aqueous solution and highly selective separation of iron from these metal ions was obtained.

TABLE 6

Distribution coefficient of iron (III), calcium (II), Magnesium (II) and Potassium (I)

| Metal Ions | $D_M$ |
|---|---|
| Fe(III) | 2653 |
| Ca(II) | 0.51 |
| Mg(II) | 0.01 |
| K(I) | 0.29 |
| Fe(III) † | 898 |

Fe(III) † denotes Fe(III) in FeCl$_3$ solution, Fe(III) denotes Fe(III) in FeCl$_3$ solution in the presence of Ca(II), Mg(II) and K(I).

Example 6—Stripping of Fe(III) from RTIL Phases

The percentage of Fe(III) stripped from the ionic liquid phase is shown in Table 7.

TABLE 7

Stripping results for various selected stripping solutions

| Stripping solutions | $S_1$ | $S_{1+2}$ | $S_{1+2+3}$ | $S_{1+2+3+4}$ | $E(\%)_2$ |
|---|---|---|---|---|---|
| H$_2$O | 16.3 | 29.2 | 40.1 | 50.8 | 83.70 |
| 0.5 mol · L$^{-1}$ HCl | 2.8 | 5.9 | 8.7 | — | 60 |
| 1 mol · L$^{-1}$ HCl | 1.2 | 2.4 | 3.5 | — | 52.59 |
| 0.1 mol · L$^{-1}$ H$_2$SO$_4$ | 22.8 | 48.9 | 70.1 | 91.4 | 99.71 |
| 0.5 mol · L$^{-1}$ H$_2$SO$_4$ | 26.29 | 55.86 | 78.86 | 99.6 | 99.55 |
| 1 mol · L$^{-1}$ H$_2$SO$_4$ | 26.08 | 57.05 | 79.88 | 100 | 99.82 |

$S_{1+2}$ represents the sum of the iron(III) stripping efficiency from the first stage ($S_1$) and the second stage ($S_2$).
$S_{1+2+3}$ and $S_{1+2+3+4}$ represent the sum of the iron stripping efficiency from the consecutive three and four stages, respectively.
$E(\%)_2$ stands for the extraction percentage of iron(III) with the recycled Cyphos IL 101.

Fe(III) was back extracted with 0.5 and 1 mol·L$^{-1}$ HCl, respectively. Less than 10% of total Fe(III) was stripped after three stages of stripping, indicating that HCl is not effective to strip Fe(III) from Cyphos IL 101. Water can back extract about 50.8% of Fe(III) after four stages of stripping. However, sulfuric acid was found to be the most effective stripping solution. The stripping percentage of Fe(III) increased with the increase of H$_2$SO$_4$ concentration in the stripping solution. Fe(III) was fully back extracted with 1 mol·L$^{-1}$ H$_2$SO$_4$ after four stages of stripping. The Cyphos IL 101 after stripping was washed with 3 mol·L$^{-1}$ HCl to scrub off residual metal ions and regenerate Cyphos IL 101. The recycled Cyphos IL 101 was reused to extract Fe(III) from freshly prepared solutions. The extraction percentage of Fe(III) can reach 99%, which is as high as that achieved using fresh Cyphos IL 101.

Characterisations of Iron-Chloro Species in Aqueous Solutions

Figure 9:
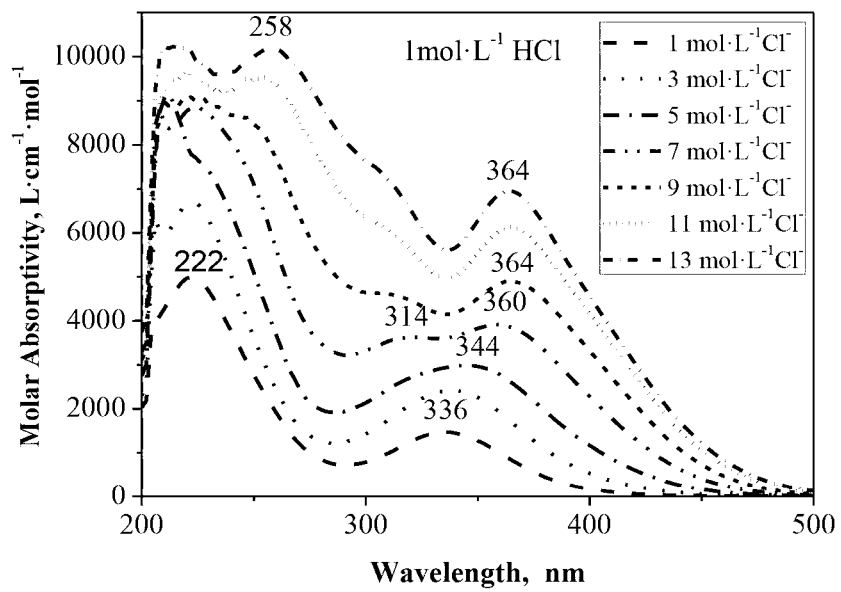
FIG. 9 shows UV-Visible spectra of Fe(III)-chloro complexes in a series of chloride concentration solutions (1 mol·L$^{-1}$ HCl 1-13 mol·L$^{-1}$ of $Cl^-$, LiCl as chloride source)

In aqueous solutions, iron has a tendency to form a series of iron chloride complexes in acid chloride media with a distinct distribution of the species $Fe^{3+}$, $[FeCl]^{2+}$, $FeCl_3$ and $[FeCl_4]^-$, depending on chloride concentrations and solution conditions. We investigated the formation of Fe(III) species both in 1 mol·$L^{-1}$ HCl solutions in the $Cl^-$ concentration range from 1 to 13 mol·$L^{-1}$ and in concentrated HCl solutions, respectively. The detailed compositions in each sample solution are given in Table 8. The UV-Visible spectra of the samples were collected at 25° C. and shown in FIGS. 9 and 10.

TABLE 8

Compositions of the solutions used for UV-Vis measurements (LiCl as chloride source)

| Group | Sample | $Fe^{3+}$ (mol · $L^{-1}$) | $Li^+$ (mol · $L^{-1}$) | HCl (mol · $L^{-1}$) | $Cl^-$ (mol · $L^{-1}$) |
|---|---|---|---|---|---|
| I | 1 | 0.41 | 0 | 1 | 1 |
|  | 2 | 0.44 | 2 |  | 3 |
|  | 3 | 0.43 | 4 |  | 5 |
|  | 4 | 0.40 | 6 |  | 7 |
|  | 5 | 0.44 | 8 |  | 9 |
|  | 6 | 0.44 | 10 |  | 11 |
|  | 7 | 0.38 | 12 |  | 13 |
| II | 1 | 0.41 | 0 | 6 | 6 |
|  | 2 | 0.43 | 0 | 8 | 8 |
|  | 3 | 0.40 | 0 | 10 | 10 |
|  | 4 | 0.43 | 0 | 12 | 12 |

When the $Cl^-$ concentration is lower than 3 mol·$L^{-1}$, two major bands appeared at 222 and 336 nm due to the formation of $[FeCl]^{2+}$ complex. A new broad band appeared at 344 nm when the chloride concentration was increased above 5 mol·$L^{-1}$, which is attributed to the formation of $[FeCl_2]^+$. When the chloride concentration was increased above 7 mol·$L^{-1}$, a new peak at 360 nm and a shoulder at 314 nm appeared due to the absorption of $FeCl_3$(aq). When the chloride concentration exceeded 9 mol·$L^{-1}$, a new peak at 258 nm appeared, meanwhile, the absorption maximum at 360 nm shifted 4 nm to a longer wavelength and became more intensive, indicating $[FeCl_4]^-$ was the dominate species in the solution. These results and the calculated molar absorptivity ($\varepsilon$) of each species are in accordance with those reported in previous studies (Stefánsson and Seward, 2008, Liu, Etschmann et. al., 2006).

Figure 10:
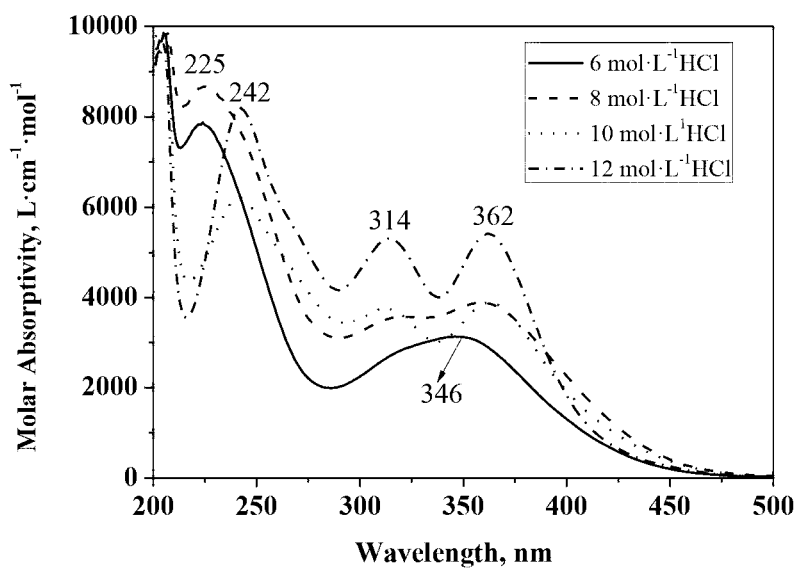
FIG. 10 shows UV-Visible spectra of Fe(III)-chloro complexes in a series of HCl concentration solutions (6-12 mol·L$^{-1}$ HCl)

FIG. 10 shows the UV-Visible spectra of Fe(III)-chloro complexes in a series of HCl concentrations ranging from 6 to 12 mol·$L^{-1}$. Three distinct absorption bands appearing at 242, 314 and 362 nm were observed. These three bands have been reported when the spectrum of $[FeCl_4]^-$ was recorded in organic phase. The shift of the characteristic bands of $[FeCl_4]^-$ in concentrated LiCl and HCl solutions can be explained by solvent effects on UV-Visible spectra, which are affected by solvent polarity and acid concentration.

Characterisation of Fe(III) Species Loaded in Cyphos IL 101

Figure 11:
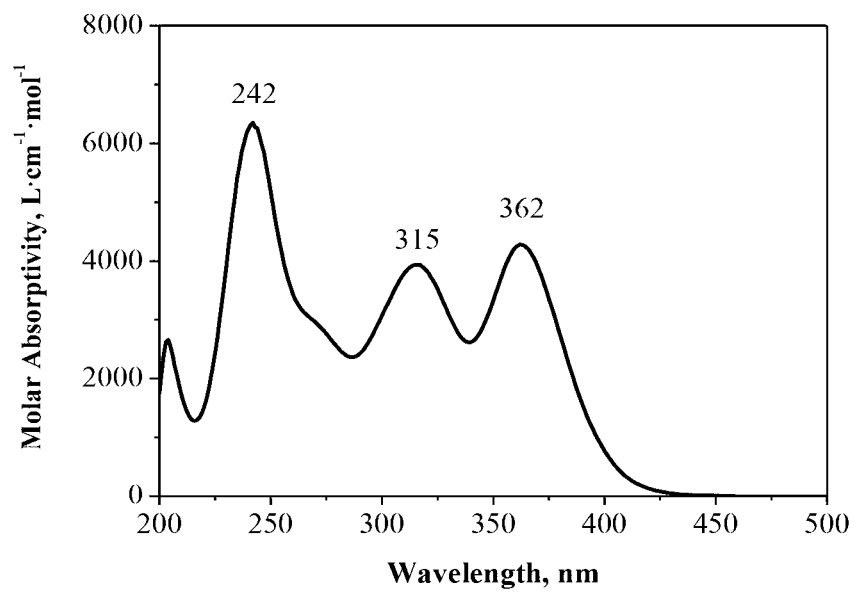
FIG. 11 shows UV-Visible absorption spectrum of Fe(III)-loaded Cyphos IL 101 in the wavelength range of 200-500 nm.
Figure 12:
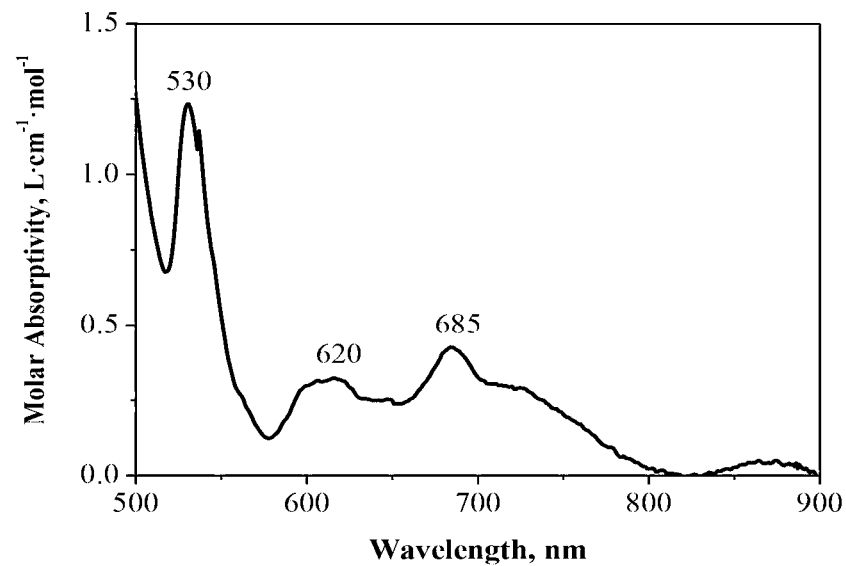
FIG. 12 shows UV-Visible absorption spectrum of Fe(III)-loaded Cyphos IL 101 in the wavelength range of 500-900 nm.

In order to understand the Fe(III) species present in Cyphos IL 101 phase, the UV-Visible spectra of Fe (III)-loaded Cyphos IL 101 were recorded and are shown in FIG. 11 (in ultraviolet range) and FIG. 12 (in visible range).

Three bands appear at 242, 315 and 362 nm in UV region and another three major bands are found at 530, 620 and 685 nm in visible region, which can be assigned to the characteristic absorption bands of $[FeCl_4]^-$ according to the results shown in FIG. 11. The molar absorptivity of $[FeCl_4]^-$ is strong in the 200-500 nm wavelength region, indicating that these bands originate from ligand to metal (L→Fe(III)) charge transfer transitions. In the 500-900 nm wavelength region, its molar absorptivity is much weaker (≤1.5 L·$cm^{-1}$·$mol^{-1}$), which is caused by d-d transitions. The above results indicate that $[FeCl_4]^-$ is the only complex formed in Cyphos IL 101 phase.

Figure 13:
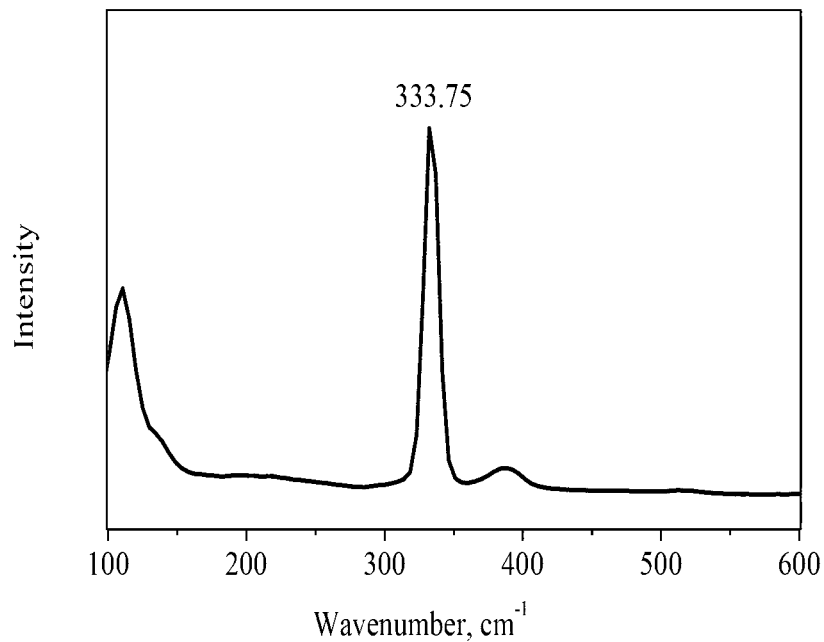
FIG. 13 shows Raman spectrum of Fe(III)-loaded Cyphos IL 101 (50 g·L$^{-1}$ Fe(III) in the IL phase)
Figure 14:
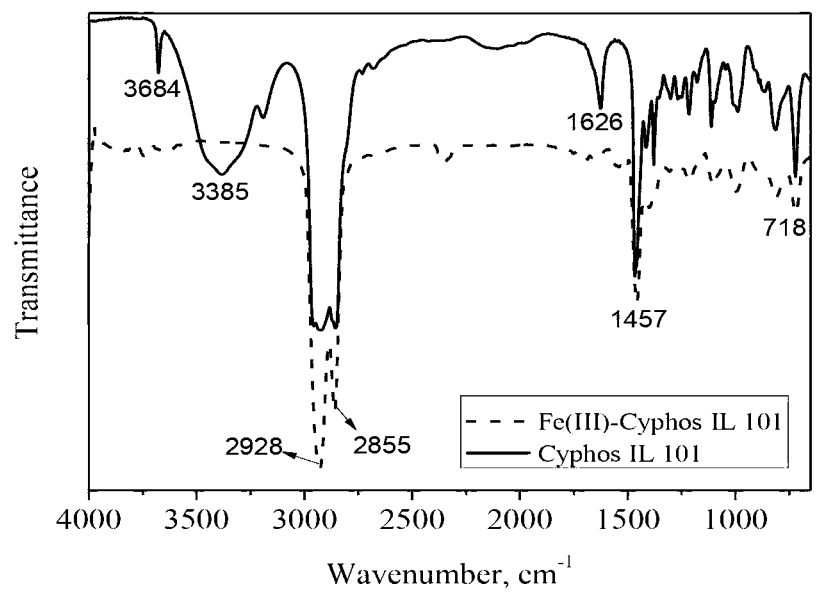
FIG. 14 shows FTIR spectra of undiluted Cyphos IL 101 (before extraction) and Fe(III)-loaded Cyphos IL 101 (after extraction)

Fe(III)-loaded Cyphos IL 101 was further characterized by Raman and FT-IR spectroscopy. A sharp peak appears at 333.75 $cm^{-1}$ in Raman spectrum (in FIG. 13), which is assigned to the stretching vibrations of the symmetric FeCl bond present in $[FeCl_4]^-$. Raman analysis further proves the existence of $[FeCl_4]^-$ anion in Cyphos IL 101. IR spectra of undiluted Cyphos IL 101 and purified Fe(III)-loaded Cyphos IL 101 were recorded and shown in FIG. 14. Both samples have absorption bands appearing at 2928, 2855 and 1457 $cm^{-1}$, which are assigned to the aliphatic C—H vibrations from $[P_{14,6,6,6}]^+$ cation. However, undiluted Cyphos IL 101 presents three extra absorption bands at 3370, 3380 and 1626 $cm^{-1}$. These bands are caused by the absorption of free water in Cyphos IL 101, which was not purified to remove water before measurement. These bands disappeared for purified Fe(III)-loaded Cyphos IL 101 sample due to the removal of water from Cyphos IL 101 phase. Apart from water absorption bands, the FTIR spectra of both samples are identical, indicating that $[P_{14,6,6,6}]^+$ cation was not altered during extraction process.

Conclusions

Undiluted phosphonium ionic liquid Cyphos IL 101 can extract Fe(III) effectively from acid chloride solutions without the need of dilution and an additional extractant. The Fe(III) extraction was fast and highly efficient with a high loading capacity. Because chloride salts like LiCl can be used as the chloride ion source, the iron(III) extraction can be carried out effectively at mild conditions. The stripping of Fe(III) from Cyphos IL 101 was feasible, indicating Cyphos IL 101 can be recovered and reused. Cyphos IL 101 is relatively cheap, therefore, the extraction process can be cost effective. In addition, Cyphos IL 101/aqueous system can provide a "greener" and safer extraction process as none of the organic solvent and extractant does not need to be introduced. Another advantage is that iron-chloro complexes were extracted into Cyphos IL 101 to form an ion pair $[P_{14,6,6,6}][FeCl_4^-]$, which is a new type of magnetic ionic liquid.

Example 7—Extraction of Iron Using Aliquat 336

Effect of HCl Concentration on Fe(III) Extraction

Figure 15:
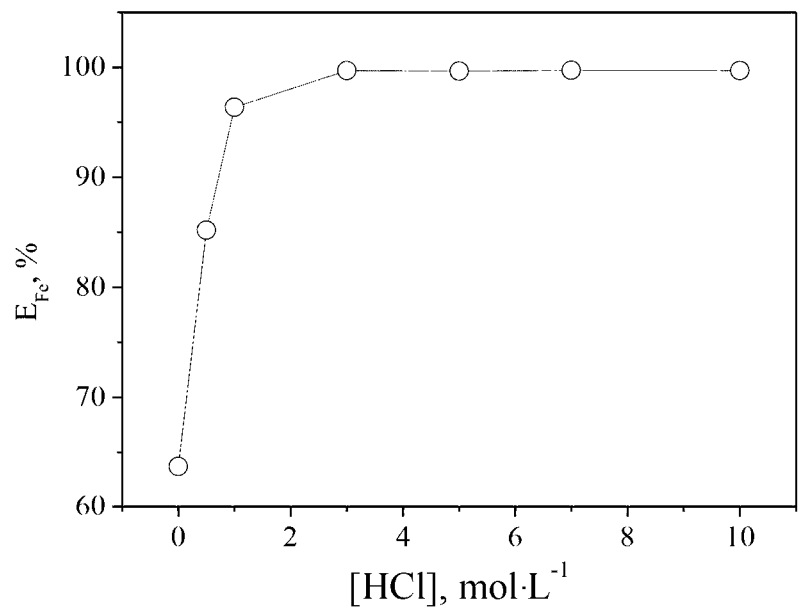
FIG. 15 shows a plot showing the effect of HCl concentration on extraction of Fe(III) from chloride media using Aliquat 336 (Aqueous solutions: 13.5 g·L$^{-1}$ Fe(III), 0-10 mol·L$^{-1}$ HCl)

The effect of HCl concentration within the range of 0 to 10 mol·$L^{-1}$ at a constant iron concentration of 13.5 g·$L^{-1}$ in the feed solution on the extraction of Fe(III) was investigated. The extraction of Fe(III) for Aliquat 336 was shown in FIG. 15. The Fe (III) extraction percentage increased from 63.70% to 99.72% with the increase in HCl concentration from 0 to 3 mol·$L^{-1}$ HCl, and then reached a plateau in the HCl concentration range from 3 to 10 Fe(III) chloride can hydrolyze when dissolved in water, but the solution was acidic with pH lower than 2. During extraction, precipitation was not observed within all HCl concentration range as Fe(III) precipitates at pH above 2.8. HCl plays multifunctional roles during extraction process including preventing Fe(III) hydrolysis, acting as a chloride source, but also functioning as a salting-out agent.

Effect of a Concentration on Fe(III) Extraction

Figure 16:
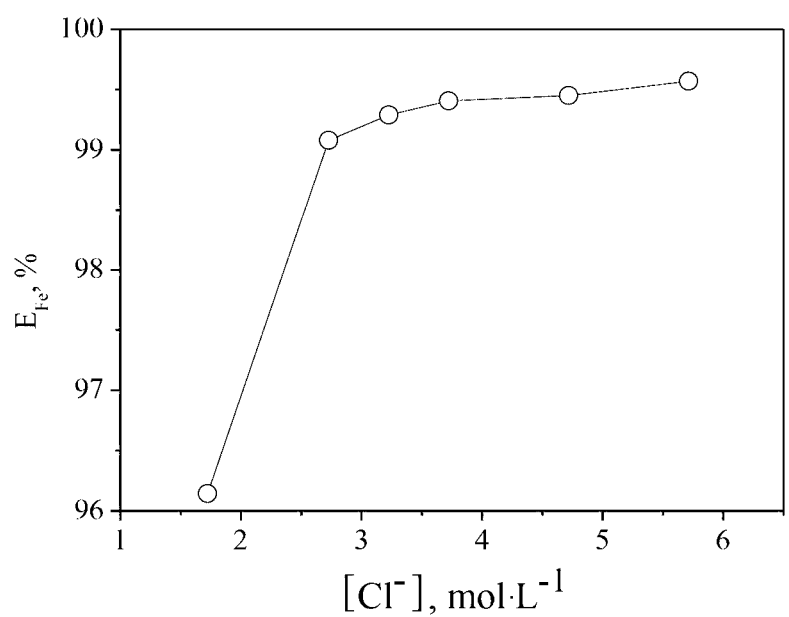
FIG. 16 shows a plot showing the effect of concentration on the extraction of Fe(III) from chloride media using Aliquat 336 (Aqueous solutions: 13.5 g·L$^{-1}$ Fe(III), 1 mol·L$^{-1}$ HCl)

The effect of chloride ion concentration within the range of 1.72 mol·$L^{-1}$ to 5.72 mol·$L^{-1}$ in the solution containing 1 mol·L$^{-1}$ of HCl on extraction of Fe(III) was studied. The experimental data was plotted in FIG. 16, illustrating that iron extraction percentage increased from 96.14 to 99.57% with. the increase of chloride concentration from 1.72 to 5.72 mol·L$^{-1}$. Chloride salt like NaCl can be used as a chloride source in Fe(III) extraction, indicating Fe(III) extraction can proceed in low acidic solutions. Compared with previous reports which Fe(III) extraction using amine extractants such as Alamine 336 and N$_{503}$ was effective only at high HCl concentrations (Deng, 1982, Lee and Lee 2005). Fe(III) extraction using Aliquat 336 can be carried out in milder acidic conditions.

Effect of Contact Time on Fe(III) Extraction

Figure 17:
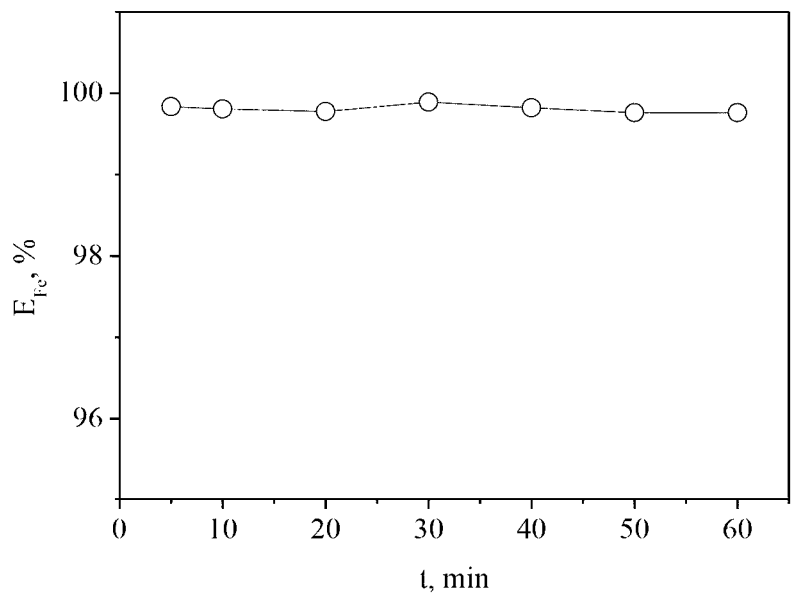
FIG. 17 shows a plot showing the effect of contact time on the extraction of Fe(III) from chloride media using Aliquat 336 (Aqueous solutions: 13.5 g·L$^{-1}$ Fe(III), 3 mol·L$^{-1}$ HCl)

As shown in FIG. 17, Fe(III) extraction with Aliquat 336 is very fast. Constant value of the Fe(III) percentage extraction (E$_{Fe}$≈100%) is achieved after 5 min. Phase separation after extraction is very fast and good, no formation of emulsions is observed.

Effect of Iron Concentration on Fe(III) Extraction

Figure 18:
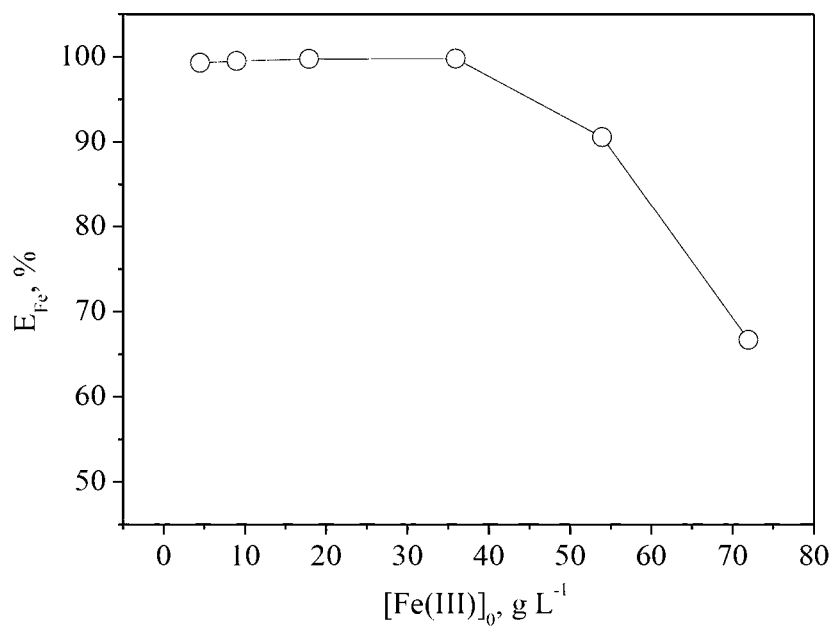
FIG. 18 shows a plot showing the extraction efficiency as a function of the iron concentration in the feed solution for Aliquat 336 (Aqueous solutions: 4.5-72 g·L$^{-1}$ Fe(III), 3 mol·L$^{-1}$ HCl)
Figure 19:
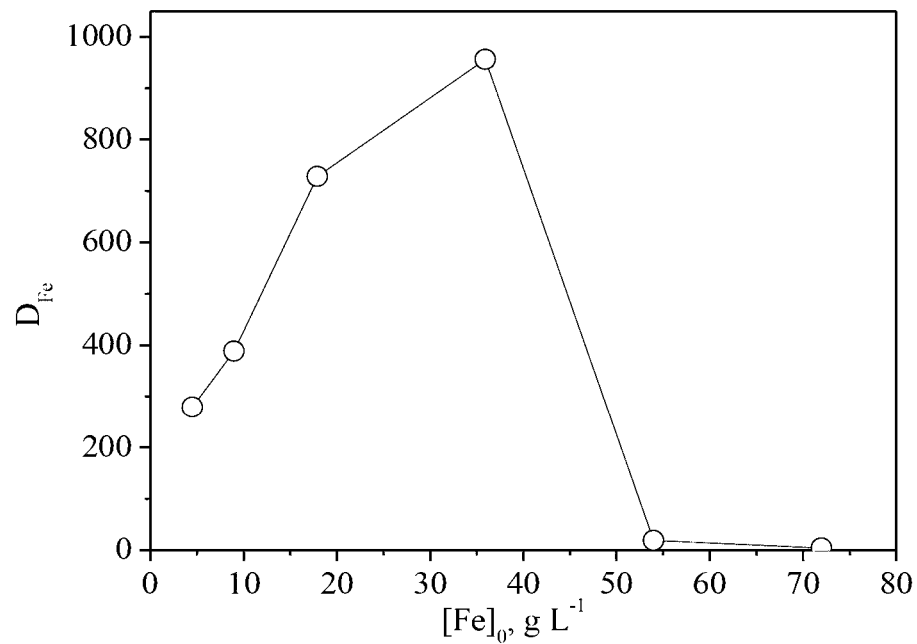
FIG. 19 shows a plot showing the distribution coefficient ($D_{Fe}$) as a function of the iron concentration in feed solutions comprising 4.5-72 g·L$^{-1}$ Fe(III) and 3 mol·L$^{-1}$ HCl.

As shown in FIG. 18, the Fe(III) extraction percentage is almost constant when the Fe(III) concentration is below 40 g·L$^{-1}$, but it decreased with the further increase of Fe(III), where only 66.7% of Fe(III) was extracted at 72 g·L$^{-1}$ Fe(III). At less than 36 g·L$^{-1}$ of iron, more than 99.5% of Fe(III) was extracted. The corresponding distribution ratio (D$_{Fe}$) were calculated and are shown in FIG. 19. The data show that D$_{Fe}$ is affected by iron concentration in the feed solution and increases when the Fe(III) concentration is below 36 g·L$^{-1}$ and then decreases sharply. These results indicate that Aliquat 336 can extract Fe(III) effectively and efficiently from acidic chloride media. In addition, phase separation after mixing was fast and the formation of the third phase and emulsion was not observed, which was generally encountered in conventional amine extraction systems.

Isotherm of Fe(III) Extraction

Figure 20:
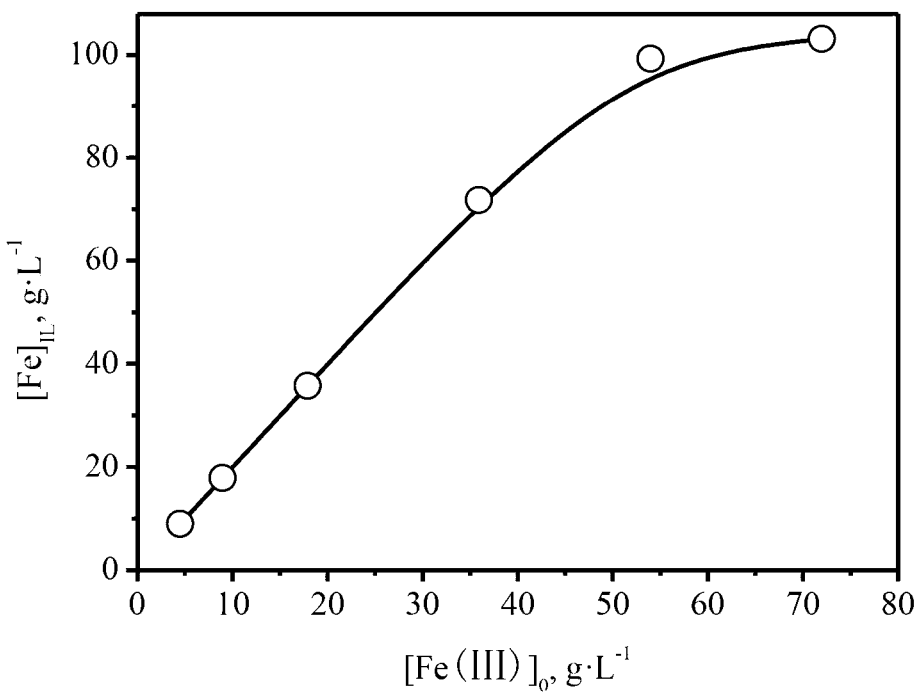
FIG. 20 shows a plot showing the extraction isotherm of Fe(III) using Aliquat 336 as extractant and feed solutions comprising 4.5-72 g·L$^{-1}$ Fe(III) and 3 mol·L$^{-1}$ HCl.

The isotherm of Fe(III) extraction using Aliquat 336 was investigated. The concentrations of Fe(III) in the ionic liquid phase ([Fe]$_{IL}$) against the corresponding concentrations in the aqueous phase were plotted in FIG. 20. The maximum loading of Fe(III) is 103.1 g·L$^{-1}$ in 1 mL of Aliquat 336, which has a higher loading capacity than that of Cyphos IL101 due to the higher moles of Aliquat 336 in the equivalent volume of 1 mL ionic liquid. The molar ratio of Fe(III) to Aliquat 336 was calculated at 0.84. The remaining Aliquat 336 was occupied by the adsorption of HCl due to co-extraction with Fe(III) in ionic liquid phase presenting in the form of HCl$_2^-$. However, a molar ratio was found at 0.91 for Fe(III) to Cyphos IL 101 under the same extraction conditions, indicating Aliquat 336 has stronger interactions with HCl, leading to more HCl molecules co-extracted. It was reported that the loading capacity of Fe(III) was at 20.9 g·L$^{-1}$ in the system containing 30% N$_{503}$ and 20% kerosene (Enxin Ma 1986), and at 27 g·L$^{-1}$ with 40% TBP (Deng, 1982). Compared with traditional Fe(III) extraction systems, ionic liquids show much higher loading capacity.

Figure 21:
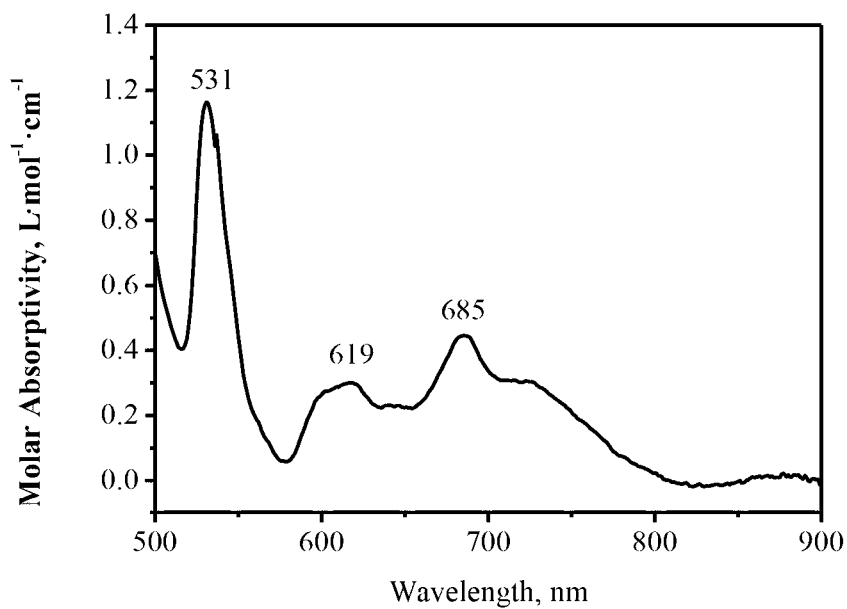
FIG. 21 shows a plot showing molar absorptivity spectrum of Fe(III)-loaded Aliquat 336 at wavelengths from 500 to 900 nm.

The UV-Visible spectrum of the Fe(III) species in the IL phase was recorded (shown in FIG. 21). Three absorption bands appearing at 531, 619, and 685 nm in the visible region is the characteristic absorption bands for FeCl$_4^-$, indicating FeCl$_4^-$ is the only species formed in Aliquat 336 (Deng et al., 2011). IR analysis shows that an identical spectra of cation were found between Fe(III)-loaded Aliquat 336 and undiluted Aliquat 336, indicating the cation of Aliquat 336 was not affected by the extraction. Similar spectroscopic results were obtained between Aliquat 336 and Cyphos IL 101 in iron(III) extraction from acidic chloride solution, the same extraction mechanism was proposed where both FeCl$_3$ ion association and FeCl$_4^-$ anion exchange with the Cl$^-$ anion of Aliquat 336 play the key roles in iron(III) extraction.

Example 8—Selective Extraction of Fe(III) from Mixed Solutions Containing Different Metal Ions To examine the effect of Al(III) concentration on the degree of selectivity of Fe(III) ions, the extraction was performed with feed aqueous solutions of different Al(III)/Fe(III) concentration ratios under 3 mol·L$^{-1}$ HCl. The Fe(III) concentration was kept at 13.5 g·L$^{-1}$. The remained Fe(III) and Al(III) concentration, distribution coefficient, as well as separation factor, are listed in Table 9.

TABLE 9

Results of selectively extraction of iron from a series of mixture solutions of different Fe(III)/Al(III) concentration ratios with Aliquat 336

| | [HCl](mol · L$^{-1}$) | | | | |
| --- | --- | --- | --- | --- | --- |
| | 3 | | | | |
| [Al(III)]/[Fe(III)] | 0 | 0.2 | 0.5 | 1 | 3 |
| [Al(III)]$_0$, (mg · L$^{-1}$) | 0 | 2700 | 6750 | 13500 | 40500 |
| [Fe]$_{aq}$, (mg · L$^{-1}$) | 44.6 | 33.8 | 25.7 | 17.6 | 8.1 |
| [Al]$_{aq}$, (mg · L$^{-1}$) | 0 | 2401 | 5798 | 11818 | 36333 |
| D$_{Fe}$ | 611 | 794 | 1038 | 1568 | 3296 |
| D$_{Al}$ | — | 0.25 | 0.26 | 0.28 | 0.23 |
| a$_{Fe, Al}$ | — | 3186 | 3992 | 5506 | 14330 |

The data shown in Table 9 indicate that iron is largely extracted to the Aliquat 336, while aluminium remains in the aqueous phase. It was found that Al(III) has a very low distribution coefficient, which was not affected significantly by the solution conditions. The distribution coefficient of Fe(III) is much higher, which further increased significantly with the increase of Al(III) concentration, resulting in a much higher separation factor a$_{Fe,Al}$ in high Al(III) concentration solution. It was generally accepted that ionic strength is increased with the increase of electrolyte concentration, leading to a decrease in the dielectric constant of the aqueous phase, which affects the activity coefficient of ionic species. Therefore, Fe(III) hydration was depressed due to the addition of aluminium salt in the aqueous phase, which enhanced Fe(III) extraction.

Apart from Al(III), Ca(II), Mg(II) and K(I) are the other metal ions present in coal gangue leaching liquor. The selective extraction of Fe(III) from the mixed solution containing Ca(II), Mg(II) and K(I) was performed. The distribution ratio for each metal is given in Table 10. Magnesium, calcium and potassium ions remain in the aqueous solution and can thus be separated from the iron.

TABLE 10

Distribution ratio for iron(III), calcium(II), magnesium(II) and potassium(I)

| Metal ions | Distribution coefficient |
| --- | --- |
| Fe(III) | 1393 |
| Ca(II) | 0.16 |
| Mg(II) | 0 |
| K(I) | 0.19 |

Ca(II), Mg(II) and K(I) were barely extracted, while the extraction of Fe(III) was enhanced in the presence of the above metal ions in the solution due to salting-out effect (Cui et. al., 2015). The high selectivity of Fe(III) against the metal ions including Al(III), Ca(II), Mg(II) and K(I) in the leach liquor indicates high purity Fe(III) species was obtained in the ionic liquid phase, which has the potential to be used as a pure Fe(III) source to produce high quality iron products from coal waste. This will bring economic benefit for this process on coal gangue treatment.

Example 9—Stripping of Fe(III) from Aliquat 336 Phase

Recovery results for various investigated stripping solutions are presented in Table 11.

TABLE 11

Recovery results for various investigated stripping solutions

| Stripping solutions | $S_1$, % | $S_{1+2}$, % | $S_{1+2+3}$, % | $E_{Fe2}$ |
|---|---|---|---|---|
| $H_2O$ | 48.95 | 81.58 | 96.10 | 98.52 |
| 0.5 mol·$L^{-1}$ HCl | 19.58 | 37.53 | 50.74 | 97.26 |
| 1 mol·$L^{-1}$ HCl | 5.55 | 12.24 | 17.78 | 77.78 |
| 0.1 mol·$L^{-1}$ $H_2SO_4$ | 52.21 | 86.47 | 92.51 | 99.11 |
| 0.5 mol·$L^{-1}$ $H_2SO_4$ | 55.42 | 96.50 | 100.0 | 99.68 |
| 1 mol·$L^{-1}$ $H_2SO_4$ | 52.16 | 94.54 | 100 | 99.79 |

$S_{1+2}$ is the sum of the first ($S_1$) and the second ($S_2$) time of the iron stripping efficiency. $S_{1-2+3}$ is the sum of the consecutive three times of iron stripping efficiency. $E_{Fe2}$ stands for the extraction percentage of iron with recycled ionic liquid.

It was observed that 0.5 mol·$L^{-1}$ of $H_2SO_4$ is an efficient stripping solution as it enables nearly 100% of Fe(III) to be removed from the loaded Aliquat 336 after three steps of stripping. 96.10% of iron can be stripped after three steps of stripping with water. Hydrochloric acid is the least effective stripping solution. After three stripping steps with $H_2SO_4$, the ionic liquid phase can be reused to extract efficiently a new load of Fe(III) from an aqueous solution. Compared with Cyphos IL 101, iron is more easily stripped from Fe-loaded Aliquat 336.

Figure 22:
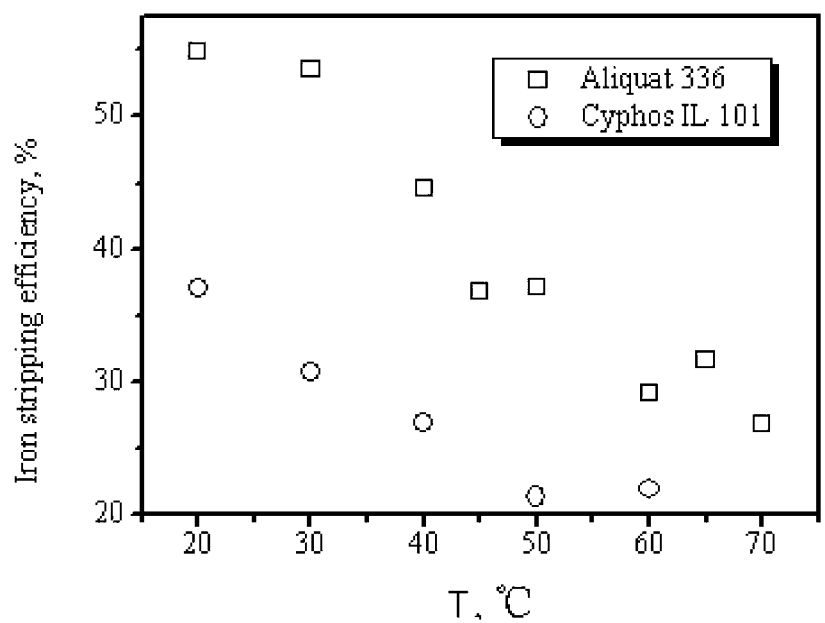
FIG. 22 shows a plot showing the effect of temperature on the Fe(III) stripping efficiency (o/w, 1:4, 1 mol·L$^{-1}$ H$_2$SO$_4$ as stripping solution)

The effect of temperature on Fe(III) stripping efficiency from both Aliquat 336 and Cyphos IL 101 was further investigated, and the results are shown in FIG. 22. The stripping efficiency of Fe(III) from both Aliquat 336 and Cyphos IL 101 decreased with the increase in stripping temperature, indicating that the Fe(III) stripping process is exothermic. Overall, Fe(III) can be stripped easily from Aliquat 336 compared with Cyphos IL 101.

Conclusions

Aliquat 336 can effectively extract iron from aluminium chloride solution. Over 99.5% of iron(III) was extracted into Aliquat 336 within 5 min from 3 mol·$L^{-1}$ HCl solution. High selectivity of iron(III) extraction over Al(III), Ca(III), Mg(II) and K(I) was observed with a separation factor of 14330 at [Al(III)]/[Fe(III)] of 3. NaCl can be used as a chloride source in the extraction from acidic chloride media. The maximum loading capacity of Fe(III) was 103 Fe(III) can be stripped effectively from Aliquat 336 with 0.5 mol·$L^{-1}$ $H_2SO_4$. Compared to Cyphos IL 101, Fe(III) was more easily stripped from Aliquat 336.

Example 10—Extraction of Iron from Coal Waste HCl Liquor 10 mL presaturated Cyphos IL 101/Aliquat 336 was mixed with 20 mL coal waste leaching liquor. After four stages of extraction each time with 20 mL fresh aqueous feed, aluminium pregnant raffinate and Fe(III)-loaded IL were generated. The former was collected to prepare $AlCl_3 \cdot 6H_2O$, and the latter went into an iron stripping process. The Fe(III)-loaded IL was stripped in three stages each with 40 mL 0.5 M $H_2SO_4$ to remove iron from IL phase. A fresh stripping solution was used for each stripping stage. The IL was further scrubbed with 3 M HCl solution. The regenerated IL was reused for a new cycle Fe(III) extraction-stripping process.

Crystallisation and Characterisation of $AlCl_3 \cdot 6H_2O$

After iron separation with ILs, the leaching liquor was evaporated and concentrated until a small amount of $AlCl_3 \cdot 6H_2O$ crystals appeared. Then HCl gas was sparged into the saturated leaching liquor. The pure $AlCl_3 \cdot 6H_2O$ was precipitated from the solution. The amount of $AlCl_3 \cdot 6H_2O$ increased with the increase of the HCl gas sparged into the aqueous solution. The crystallization efficiency of $AlCl_3 \cdot 6H_2O$ was 73%. Increase of the temperature was not beneficial for the crystallisation. The iron content in resulted $AlCl_3 \cdot 6H_2O$ was lower than 0.01%.

After extraction, the crystallisation of $AlCl_3 \cdot 6H_2O$ was performed using the aqueous raffinate described earlier. In order to depress the hydrolysis of $AlCl_3 \cdot 6H_2O$, the crystallisation was carried out under reduced pressure to decrease the temperature for water evaporation and reduce HCl volatilisation. The metal content in the obtained crystals was measured with ICP. The weight percentages of $AlCl_3 \cdot 6H_2O$ and other metal impurities of two batch products are shown in Table 12. The ICP analysis of the $AlCl_3 \cdot 6H_2O$ crystallized directly from leach liquor without extraction was included as a comparison.

TABLE 12

Quantitative analysis of the $AlCl_3 \cdot 6H_2O$

| Specifications | 1 | 2 batch 1 | 2 batch 2 | 3 batch 1 | 3 batch 2 | Standard specification (HG/T 3251-2010) top-grade | first-class | qualified |
|---|---|---|---|---|---|---|---|---|
| $\omega_{AlCl3 \cdot 6H2O}$, % | 96.0 | 97.55 | 97.56 | 98.23 | 98.03 | ≥97.5 | ≥95.5 | ≥93.0 |
| $\omega_{Fe}$, % | 0.083 | 0.0039 | 0.0038 | 0.0029 | 0.0028 | ≤0.002 | ≤0.01 | ≤0.05 |
| $\omega_{Ca}$, % | 0.24 | 0.060 | | 0.019 | | — | — | — |
| $\omega_K$, % | 0.19 | 0.076 | | 0.026 | | — | — | — |
| $\omega_{Mg}$, % | 0.062 | 0.045 | | 0.051 | | — | — | — |

Crystal 1 denotes $AlCl_3 \cdot 6H_2O$ prepared from coal waste leaching liquor without iron removal; Crystal 2 and 3 denote the $AlCl_3 \cdot 6H_2O$ prepared from coal waste leaching liquor after iron removal with Cyphos IL 101 and Aliquat 336.

Figure 23:
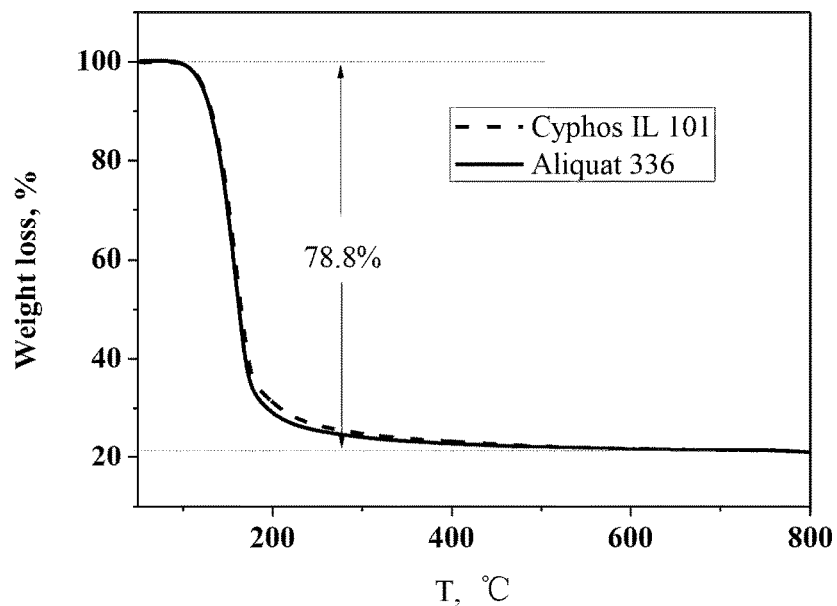
FIG. 23 shows TG analysis of the $AlCl_3 \cdot 6H_2O$ after iron removal with Aliquat 336.

TG analyzer and XRD were conducted to characterise the purity and structure of the prepared $AlCl_3 \cdot 6H_2O$ crystal. The thermal decomposition of AlCl$_3$.6H$_2$O crystal can be described as followed: 2AlCl$_3$.6H$_2$O→Al$_2$O$_3$+6HCl+9H$_2$O. According to the equation, a 78.8% of weight loss is obtained due to the thermal loss of HCl and H$_2$O. An equivalent amount of thermal loss can be found from the prepared AlCl$_3$.6H$_2$O crystal shown in FIG. 23. This means that one aluminium chloride molecule has six associated water molecules in the crystal, indicating a high purity AlCl$_3$.6H$_2$O product was obtained.

Figure 24:
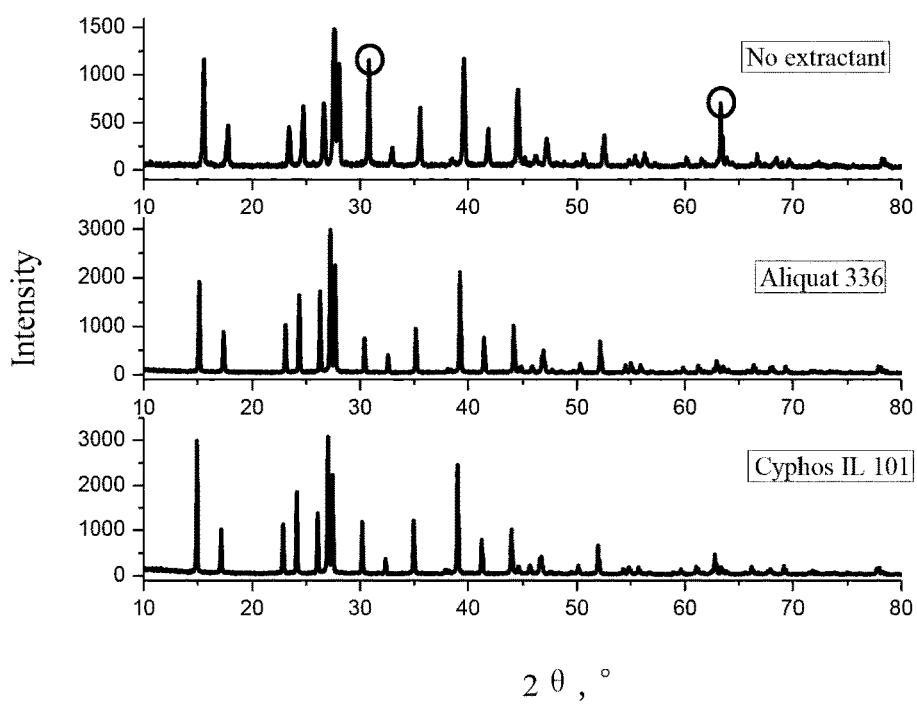
FIG. 24 shows XRD pattern of the crystal products before and after iron removal process.

XRD analysis is shown in FIG. 24 further proves that the AlCl$_3$.6H$_2$O products have high purity and crystallinity after Fe(III) removal. However, the XRD patterns of the crystal without Fe(III) removal increase the intensity at 2θ positions of 30.97° and 63.37°, respectively. This might be caused by the high content of Fe(III) in the crystal product.

Example 11—Regeneration and Reuse Ability of ILs

Figure 25:
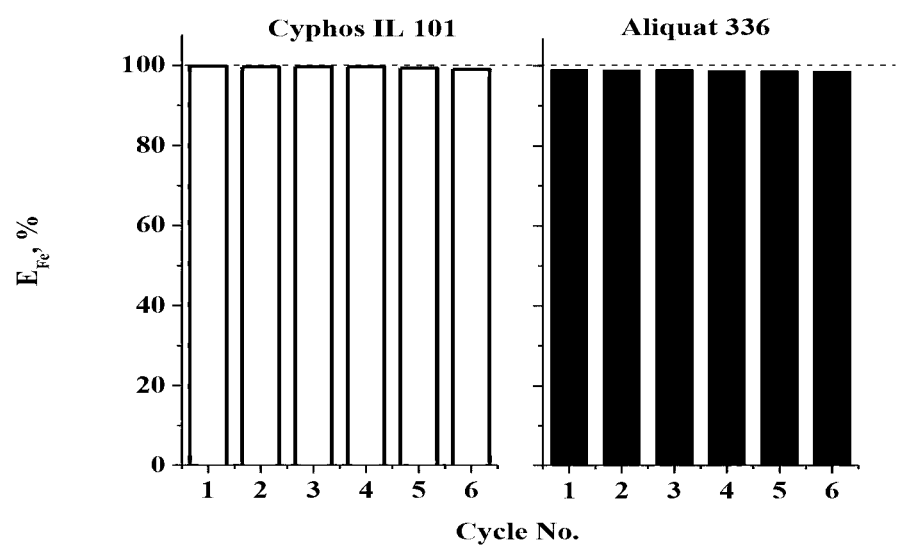
FIG. 25 shows a plot showing the extraction efficiency of Fe(III) with regenerated ILs at different cycle times.

The capability to reuse the IL phase is important in the feasibility of industrial applications of IL-based extraction. The cycle of extraction-stripping process was repeated for six times with the regenerated Aliquat 336 and Cyphos IL 101. The extraction results of Fe(III) are shown in FIG. 25.

The extraction efficiency of Fe(III) from cycles 1 to 6 are 99.75%, 99.58%, 99.67%, 99.58%, 99.33%, 99.02% with Cyphos IL 101, respectively; and 98.98%, 98.98%, 98.99%, 98.80%, 98.72% and 98.59% with Aliquat 336, respectively. The results indicate Cyphos IL 101 has a little higher extraction efficiency of Fe(III) from coal gangue acid leaching filtrate than Aliquat 336. However, Cyphos IL 101 has a longer cycle period for its more stripping times with 0.5 mol·L$^{-1}$ H$_2$SO$_4$. The slight decrease of Fe(III) extraction efficiency as the cycle number increases was caused by the ILs loss in the extraction-stripping process.

Compared with NTF$_2^-$, BF$_4^-$ and PF$_6^-$ based ionic liquids, Aliquat 336 and Cyphos IL 101 tends to be more hydrophilic due to the chloride anion. The solubility of Aliquat 336 and Cyphos IL 101 is greater than the other ionic liquids. In addition, a small amount of very fine droplets of the ILs were suspended in the aqueous phase after phase separation due to the low interfacial tension between Aliquat 336/Cyphos IL 101 and the aqueous solution, leading to a prolonged phase separation and an ionic liquid loss. The loss of ionic liquid was evaluated using the total organic carbon (TOC) content in the aqueous phase. The TOC value of the aqueous solution was 130-140 mg·L$^{-1}$ after the mixture being settled for 3 hours, and 30-40 mg·L$^{-1}$ for 48 hours. Two methods were attempted to accelerate the phase separation and recover the ionic liquid loss. One was centrifugation after mixing and the other method was filtration using a 0.45 μm membrane. The aqueous phase after each extraction or stripping process was filtrated with a 0.45 μm membrane after the mixture was settled for 1.5 h. The collected ionic liquid on the membrane can be recycled. It has been reported that the loss of ionic liquids can be reduced by a salting-out process or the IL can be recovered using a nanofiltration technique (Wellens, Goovaerts et al. 2013).

Conclusion

This technique can be applied effectively in the removal of Fe(III) from HCl leach solutions of coal gangue, which is essential to obtain high quality Al(III) chloride product from coal gangue. The regeneration of Aliquat 336/Cyphos IL 101 was also tested. The AlCl$_3$.6H$_2$O was prepared from the leach solution after iron(III) removal. The iron content in the obtained AlCl$_3$.6H$_2$O crystal was less than 0.005% (wt.), indicating a high purity and crystallinity of AlCl$_3$.6H$_2$O crystal was obtained. This work discovered an effective way to remove iron(III) from a coal waste leach solution, facilitating the production of high value added aluminium products from coal waste.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

REFERENCES

Amani, V., Safari N. Khavasi H. R. (2007). "Synthesis, characterization and crystal structure determination of iron(III) hetero-ligand complexes containing 2,2'-bipyridine, 5,5'-dimethyl-2,2'-bipyridine and chloride, [Fe(bipy)Cl4][bipy.H] and [Fe(dmbipy)2Cl2][FeCl4]." *Polyhedron* 26(15): 4257-4262.

Ann E. Visser, R. P. S., W. Matthew Reichert, Heather D. Willauer, Jonthan G. Huddleston, Robin D. Rogers• (2003). "Room temperature ionic liquids as replacements for traditional organic solvents and their applications towards "green chemistry" in separation processes." *Green Industrial Applications of Ionic Liquids*. R. D. Rogers, Seddon, K. R., Volkov, S., and Eds., Dordrecht, The Netherlands: 137-156.

Bailey J. K., Brinker C. J., Mecartney M. L. (1993). "Growth Mechanisms of Iron Oxide Particles of Differing Morphologies from the Forced Hydrolysis of Ferric Chloride Solutions." *Journal of Colloid and Interface Science* (157): 1-13.

Bradaric, C. J., Downard, A., Kennedy, C., Robertson, A. J. and Zhou, Y. (2003). "Industrial preparation of phosphonium ionic liquids." *Green Chemistry*, 2003, 5(2): 143-152.

Brenna M. Krieger, H. Y. L., Thomas J. Emge, James F. Wishart, Edward W. Castner, Jr. (2010). "Ionic liquids and solids with paramagnetic anions." *Phys. Chem. Chem. Phys.*, (12): 8919-8925.

Chang, Y. Zhai, X. Li, B. Fu, Y. (2010). "Removal of iron from acidic leach liquor of lateritic nickel ore by goethite precipitate." *Hydrometallurgy*, 101, 84-87.

Cieszynska, A. and Wisniewski M. (2010). "Extraction of palladium(II) from chloride solutions with Cyphos® IL 101/toluene mixtures as novel extractant." *Separation and Purification Technology* 73(2): 202-207.

Del Sesto, Mccleskey T. M., Burrell A. K., Baker G. A., Thompson J. D. (2008). "Structure and magnetic behavior of transition metal based ionic liquids." *Chem Commun*, (4): 447-449.

Deng, N., Li M., Zhao L., Lu C., de Rooy S. L., Warner S. M. (2011). "Highly efficient extraction of phenolic compounds by use of magnetic room temperature ionic liquids for environmental remediation." *J Hazard Mater* 192(3): 1350-1357.

Deng. "Extraction of iron from Co(II) and Ni(II) solution." *Nonferrous metal*, 1982(4), 38-42.

Earle M. J., Seddon, K. R. (2000). "Ionic liquids. Green solvents for the future." *Pure Appl. Chem.* 72(7): 1391-1398.

Fraser K. J. and MacFarlane D. R. (2009). "Phosphonium-Based Ionic Liquids: An Overview copy." *Aust. J. Chem.* 62: 309-321.

Frost, R. L., Keeffe E. C. (2009). "Raman spectroscopic study of the sulphite bearing minerals scotlandite, hannebachite and orschallite implications for the desulphation of soils." *Journal of Raman Spectroscopy* 40(3): 244-248.

Geng X. W., Ma. H. W., Su S. Q. (2012). "The Preparation of Aluminium Hydroxide from High-Alumina Gangue Desilication Residues Based on Soda Lime Sintering Method." *Bulletin of Mineralogy, Petrology and Geochemistry,* 31(6): 635-640.

Jain S. K., Garg B. S., Bhoon, Y. K. (1986). "Iron(III) Complexes of 2-Acetylpyridine-4-phenyl-3-thiosemicarbazones: Magnetic, E.s.r. and Spectral Studies." *Transition Met. Chem.* 11:89-95.

Kogelnig, D., Stojanovic A., Jirsa F., Körner W., Krachler R. (2010). "Transport and separation of iron(III) from nickel (II) with the ionic liquid trihexyl(tetradecyl)phosphonium chloride." *Separation and Purification Technology* 72(1): 56-60.

Kogelnig, Stojanovic A., et. al., (2011). "Quaternary Ammonium and Phosphonium." *Ionic Liquids: Theory, Properties, New Approaches:* 657-680.

Lee, M. S. and Lee K. J. (2005). "Separation of iron and nickel from a spent FeCl3 etching solution by solvent extraction." *Hydrometallurgy,* 80(3): 163-169.

Li, M., He Z., Zhou L. (2011). "Removal of iron from industrial grade aluminium sulfate by primary amine extraction system." *Hydrometallurgy* 106(3-4): 170-174.

Liu W., Etschmann B., Brugger J., Spiccia L., Foran G., McInnes B. (2006). "UV-Vis spectrophotometric and XAFS studies of ferric chloride complexes in hyper-saline LiCl solutions at 25-90° C." *Chemical Geology* 231(4): 326-349.

Nayl, A. A. (2010). "Extraction and separation of Co(II) and Ni(II) from acidic sulfate solutions using Aliquat 336". *Journal of Hazardous Materials* 173(1-3): 223-230.

Ma E., Yan S., Wang S., Chengye Y. "Study on the equilibrium and coordination compound of ion extraction with N,N-dI(1-methylheptyl)acetamide in hydrochloric acid." *Chinese Journal of Applied Chemistry,* 1986, 3(6): 37-39.

Mishra, R. K. Rout, P. C. Sarangi, K. Nathsarma, K. C. (2010). "A comparative study on extraction of Fe(III) from chloride leach liquor using TBP, Cyanex 921 and Cyanex 923." *Hydrometallurgy,* 104, 298-303.

Qian, T. and Li J. (2015) "Synthesis of Na-A zeolite from coal gangue with the in-situ crystallization technique." *Advanced Powder Technology,* 26(1): 98-104.

Quinn, J. E., Ogden M. D., Soldenhoff K. (2013). "Solvent Extraction of Uranium (VI) from Chloride Solutions using Cyphos IL-101." *Solvent Extraction and Ion Exchange* 31(5): 538-549.

Rabinowitch E., Stockmayer W. H. (1942). "Association of ferric ions and chloride, bromide and hydroxyl ions (A spectroscopic study)." *J. Am. Chem. Soc.,* 64: 335-347.

Stefánsson, A. and Seward T. M. (2008). "A spectrophotometric study of iron(III) hydrolysis in aqueous solutions to 200° C." *Chemical Geology* 249(1-2): 227-235.

Stefánsson, A., Lemke K. H., Seward T. M. (2008). Iron(III) complexation in hydrothermal solutions—An experimental and theoretical study. *Proceedings of the 15th International Conference on the Properties of Water and Steam,* 15, 1-7, Berlin.

Stefansson, A. (2007). "Iron(III) Hydrolysis and Solubility at 25° C." *Environ. Sci. Technol.* 41: 6117-6123.

Swarnkar, S. R., Gupta, B. L., Sekharan, R. D. (1996). "Iron control in zinc plant residue leach solution." *Hydrometallurgy,* 42, 21-26.

Sun, Z. C., et al. (2011). "Synthesis, Characterization and Spectral Properties of Substituted Tetraphenylporphyrin Iron Chloride Complexes." *Molecules* 16(12): 2960-2970.

Tian, G. C., et al. (2010). "Application of ionic liquids in hydrometallurgy of nonferrous metals." *Transactions of Nonferrous Metals Society of China* 20(3): 513-520.

Wei, G. T., Yang Z., Chen C. J. (2003). "Room temperature ionic liquid as a novel medium for liquid/liquid extraction of metal ions." *Analytica Chimica Acta* 488(2): 183-192.

Weliens, S., Thijs, B., Binnemans, K. (2012). "An environmentally friendlier approach to hydrometallurgy: highly selective separation of cobalt from nickel by solvent extraction with undiluted phosphonium ionic liquids." *Green Chem.,* 14, 1657-1665.

Weliens, S., Goovaerts, R., Möller, C., Luyten, J., Thijs, B., Binnemans, K. (2013) "A continuous ionic liquid extraction process for the separation of cobalt from nickel." *Green Chem.,* 15, 3160-3164.

Xie, Z. L. and Taubert A. (2011). "Thermomorphic Behavior of the Ionic Liquids [C4mim][FeCl4] and [Cl2mim][FeCl4]." *ChemPhysChem* 12(2): 364-368.

Yu, S. Q.; Wu, Z. C. Application of the principle of hard and soft acids and bases to salting-out effect in solvent extraction. *Journal of Nuclear and Radiochemistry,* 1986, 3, 181-184.

Zhao, R. and Pan P. (2001). "A spectrophotometric study of Fe(II)-chloride complexes in aqueous solutions from 10 to 100° C." *Canadian Journal of Chemistry* 79(2): 131-144.

Zhao, H. (2014). "Introduction of high alumina coal gangue resources and industrialization of alumina extraction technologies in China." *Conservation and utilization of mining resources,* 1: 54-58.

Zhu, T. *Solvent extraction and ion exchange,* first ed., Metallurgical Industry Press, Beijing, 2005.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

The invention claimed is:

1. A process for selectively removing Fe(III) ions from a coal gangue leachate, the process comprising contacting the leachate with an organic phase comprising a phosphonium salt or ammonium salt ionic liquid under liquid-liquid extraction conditions for a time sufficient to allow transfer of at least some of the Fe(III) ions from the leachate to the organic phase to provide a Fe(III) ion laden organic phase and an Fe(III) depleted leachate, and separating the Fe(III) ion laden organic phase from the Fe(III) depleted leachate.

2. The process according to claim 1, wherein the organic phase is free of an extraneous organic extractant.

3. The process according to claim 1, wherein the organic phase is free of a solvent other than the phosphonium salt or ammonium salt ionic liquid.

4. The process according to claim 1, wherein the organic phase consists essentially of the phosphonium salt or ammonium salt ionic liquid.

5. The process according to claim 1, wherein the process further comprises treating the coal gangue leachate to increase the concentration of inorganic anions therein prior to contact with the organic phase.

6. The process according to claim 5, wherein the inorganic anion is a halide ion.

7. The process according to claim 6, wherein the halide ion is selected from the group consisting of iodide, bromide, chloride, and fluoride.

8. The process according to claim 7, wherein the halide ion is chloride.

9. The process according to claim 5, wherein the step of treating the coal gangue leachate to increase the concentration of inorganic anions comprises adding a source of inorganic anions to the aqueous feedstock.

10. The process according to claim 1, wherein the coal gangue leachate comprises non-ferric ions selected from one or more of the group of ions consisting of aluminium, magnesium, calcium and potassium ions and the Fe(III) ions are selectively removed from the coal gangue leachate in the process.

11. A process for recovering high purity aluminium chloride from coal gangue, the process comprising leaching the coal gangue to provide a coal gangue leachate, contacting the leachate with an organic phase comprising a phosphonium salt or ammonium salt ionic liquid under liquid-liquid extraction conditions for a time sufficient to allow selective transfer of at least some of Fe(III) ions from the leachate to the organic phase to provide a Fe(III) ion laden organic phase and an Fe(III) depleted leachate, separating the Fe(III) ion laden organic phase from the Fe(III) depleted leachate, and recovering aluminium chloride from the Fe(III) depleted leachate.

12. The process according to claim 11, wherein the organic phase is free of an extraneous organic extractant.

13. The process according to claim 11, wherein the organic phase is free of a solvent other than the phosphonium salt or ammonium salt ionic liquid.

14. The process according to claim 11, wherein the organic phase consists essentially of the phosphonium salt or ammonium salt ionic liquid.

15. The process according to claim 11, wherein the process further comprises treating the coal gangue leachate to increase the concentration of inorganic anions therein prior to contact with the organic phase.

16. The process according to claim 15, wherein the inorganic anion is a halide ion.

17. The process according to claim 16, wherein the halide ion is selected from the group consisting of iodide, bromide, chloride, and fluoride.

18. The process according to claim 17, wherein the halide ion is chloride.

19. The process according to claim 15, wherein the step of treating coal gangue leachate to increase the concentration of inorganic anions comprises adding a source of inorganic anions to the aqueous feedstock.

20. The process according to claim 11, wherein the coal gangue leachate comprises non-ferric ions selected from one or more of the group of ions consisting of aluminium, magnesium, calcium and potassium ions and the Fe(III) ions are selectively removed from the coal gangue leachate in the process.

* * * * *